United States Patent
Häusler et al.

(10) Patent No.: US 9,928,291 B2
(45) Date of Patent: Mar. 27, 2018

(54) AUTHOR DISAMBIGUATION AND PUBLICATION ASSIGNMENT

(71) Applicant: ResearchGate GmbH, Berlin (DE)

(72) Inventors: Michael Häusler, Berlin (DE); Viacheslav Zholudev, Berlin (DE); Horst Fickenscher, Berlin (DE); Stephen Mansfield, Berlin (DE); Mark Howard-Banks, Berlin (DE); Eduardo Ojeda, Berlin (DE); Vincenz Priesnitz, Berlin (DE)

(73) Assignee: ResearchGate GmbH, Berlin (DE)

( * ) Notice: Subject to any disclaimer, the term of this patent is extended or adjusted under 35 U.S.C. 154(b) by 0 days.

(21) Appl. No.: 15/199,581

(22) Filed: Jun. 30, 2016

(65) Prior Publication Data

US 2017/0004200 A1   Jan. 5, 2017

Related U.S. Application Data

(63) Continuation-in-part of application No. 14/988,469, filed on Jan. 5, 2016.

(60) Provisional application No. 62/186,641, filed on Jun. 30, 2015.

(51) Int. Cl.
   *G06F 17/30*   (2006.01)

(52) U.S. Cl.
   CPC .. *G06F 17/30598* (2013.01); *G06F 17/30312* (2013.01); *G06F 17/30401* (2013.01)

(58) Field of Classification Search
   None
   See application file for complete search history.

(56) References Cited

U.S. PATENT DOCUMENTS

| | | | |
|---|---|---|---|
| 5,970,505 A * | 10/1999 | Ebrahim | G06F 17/30014 707/999.104 |
| 6,199,067 B1 | 3/2001 | Geller | |
| 7,444,374 B1 * | 10/2008 | Baker | G06F 9/44 709/206 |
| 7,953,724 B2 | 5/2011 | Griffith | |
| 8,166,155 B1 | 4/2012 | Rachmeler | |

(Continued)

FOREIGN PATENT DOCUMENTS

EP   2664997 A2   11/2013

OTHER PUBLICATIONS

"A probabilistic similarity metric for Medline records: A model for author name disambiguation", Vetle I Torvik and Marc Weber: Journal of the American Society for Information Science and Technology, Wiley & Sons, New York, NY, US (Feb. 2, 2002), 140-158.

(Continued)

*Primary Examiner* — Hung Le
(74) *Attorney, Agent, or Firm* — Schwegman Lundberg & Woessner, P.A.

(57) ABSTRACT

Described herein are computer-implemented systems and methods for automatically disambiguating author names for a plurality of publications so as to create clusters of author name mentions that are with high probability associated with a single author identity for each cluster. Also described are systems and methods for assigning the clusters to respective unique author identities, automatically and/or based on human input (e.g., as received from authors, co-authors, or administrative curators).

18 Claims, 19 Drawing Sheets

(56) References Cited

U.S. PATENT DOCUMENTS

| | | |
|---|---|---|
| 8,386,487 B1 | 2/2013 | Ben-Artzi |
| 8,538,898 B2 | 9/2013 | Lu et al. |
| 8,799,237 B2 | 8/2014 | Walsh |
| 9,336,330 B2* | 5/2016 | Connor ............... G06F 17/3053 |
| 9,521,182 B1* | 12/2016 | Tang ....................... H04L 67/02 |
| 2004/0205468 A1* | 10/2004 | Lightner ................. G06F 17/24 715/208 |
| 2005/0149538 A1* | 7/2005 | Singh ............... G06F 17/30893 |
| 2005/0273707 A1* | 12/2005 | Chu .................... G06F 17/2247 715/239 |
| 2006/0251292 A1 | 11/2006 | Gokturk et al. |
| 2008/0162275 A1* | 7/2008 | Logan ............... G06F 17/30864 705/12 |
| 2008/0275859 A1* | 11/2008 | Griffith ............... G06F 17/3071 |
| 2009/0018833 A1 | 1/2009 | Kozat et al. |
| 2009/0018917 A1* | 1/2009 | Chapman ............... G06Q 30/02 705/14.46 |
| 2009/0222368 A1* | 9/2009 | McCauley ............ G06Q 30/02 705/35 |
| 2011/0282890 A1* | 11/2011 | Griffith ............... G06F 17/3064 707/758 |
| 2013/0097166 A1* | 4/2013 | Fink ...................... G06Q 30/02 707/737 |
| 2013/0198192 A1* | 8/2013 | Hu .................... G06F 17/30705 707/738 |
| 2013/0212081 A1 | 8/2013 | Shenoy et al. |
| 2013/0262465 A1* | 10/2013 | Galle ..................... G06F 17/30 707/737 |
| 2013/0297788 A1* | 11/2013 | Itoh .................. G06F 17/30073 709/224 |
| 2014/0222928 A1* | 8/2014 | Scholtes ............... H04L 51/046 709/206 |
| 2014/0258832 A1* | 9/2014 | Hepp .................. G06F 17/2247 715/234 |
| 2014/0282904 A1* | 9/2014 | Brunn .................... H04L 67/22 726/4 |
| 2017/0004198 A1 | 1/2017 | Zholudev et al. |
| 2017/0004199 A1 | 1/2017 | Häusler et al. |

OTHER PUBLICATIONS

"European Application Serial No. 16176361.1, Extended European Search Report mailed Oct. 19, 2016" 9 pgs.

Aswani, Niraj, et al., "Mining Information for Instance Unifaction", The Semantic Web—ISWC 2006 : 5th International Semantic Web Conference, ISWC 2006, Athens, GA, USA, (Nov. 5-9, 2006), 329-342.

Huang, Jian, et al., "Fast Author Name Disambiguation in CiteSeer", ISI technical report 66, (2006), 13 pgs.

"U.S. Appl. No. 14/988,469, Examiner interview Summary dated Aug. 29, 2017", 3 pgs.

"U.S. Appl. No. 14/988,469, Non Final Office Action dated May 9, 2017", 25 pgs.

"U.S. Appl. No. 14/988,469, Response filed Aug. 9, 2017 to Non Final Office Action dated May 9, 2017", 11 pgs.

"U.S. Appl. No. 15/199,518, Examiner Interview Summary dated May 15, 2017", 12 pgs.

"U.S. Appl. No. 15/199,518, Final Office Action dated Aug. 11, 2017", 14 pgs.

"U.S. Appl. No. 15/199,518, Non Final Office Action dated Mar. 1, 2017", 26 pgs.

"U.S. Appl. No. 15/199,518, Response filed Jun. 1, 2017 Non Final Office Action dated Mar. 1, 2017", 14 pgs.

"European Application Serial No. 16176361.1, Response filed Jul. 4, 2017 to Extended European Search Report dated Oct. 19, 2016", 12 pgs.

"U.S. Appl. No. 14/988,469, Final Office Action dated Aug. 31, 2017", 21 pgs.

"U.S. Appl. No. 15/199,518, Response filed Nov. 13, 2017 to Final Office Action dated Aug. 11, 2017", 14 pgs.

* cited by examiner

```
JANE M DOE
PUBL 1 – JANE DOE
PUBL 2 – JANE DOE
PUBL 3 – J M DOE
PUBL 4 – J DOE
PUBL 5 – J DOE
```
```
JOHN L DOE
PUBL 11 JOHN L DOE
PUBL 12 – JOHN DOE
PUBL 13 – J L DOE
PUBL 14 – J L DOE
PUBL 15 – J DOE
```
```
JANE L DOE
PUBL 20 – JANE L DOE
PUBL 21 – JANE DOE
PUBL 22 – J L DOE
PUBL 23 – J DOE
```
FIG. 5A
SPECIALIZATION LEVEL 1
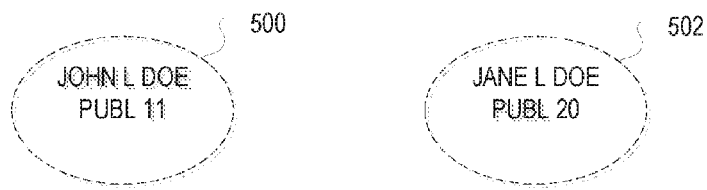
SPECIALIZATION LEVEL 2
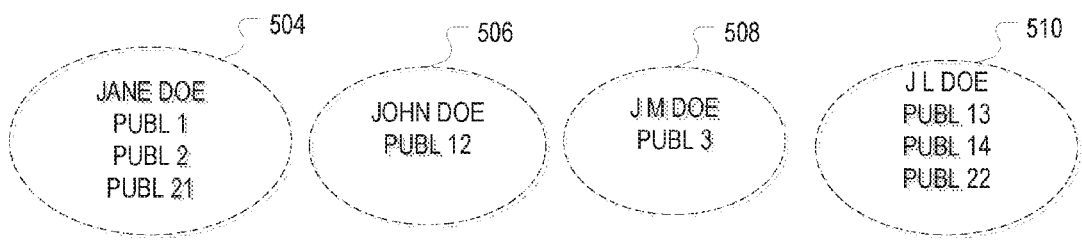
SPECIALIZATION LEVEL 3
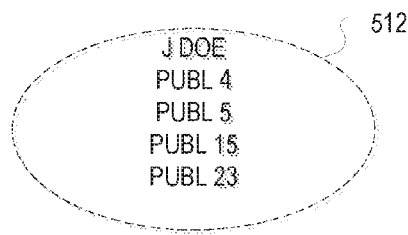
FIG. 5B

AUTHOR DISAMBIGUATION AND PUBLICATION ASSIGNMENT

CROSS-REFERENCE TO RELATED APPLICATIONS

This application claims priority to and the benefit of U.S. Provisional Application No. 62/186,641, filed on Jun. 30, 2015, and is a continuation-in-part of U.S. patent application Ser. No. 14/988,469, filed on Jan. 5, 2016, both of which are incorporated herein by reference in their entireties.

BACKGROUND

Research articles and similar publications, whether disseminated in print or electronically (e.g., in the form of pdf documents), are often associated with author name ambiguity. Such ambiguity often arises because author names are not sufficiently distinct given the large numbers of authors publishing across various disciplines. Author ambiguity is exacerbated by the inconsistent manner in which author names are reported in publications, due to a lack of standards and common practices. For example, different authors may publish under the same name, while the same author could publish under various names due to abbreviations, nicknames, etc. This limits the search and discovery of relevant publications attributable to each individual author.

BRIEF DESCRIPTION OF THE DRAWINGS

FIGS. 5A-5F are schematic diagrams illustrating the forming of compatibility sets and clustering, in accordance with various embodiments, for an example set of author name mentions.

DESCRIPTION

Figure 1:
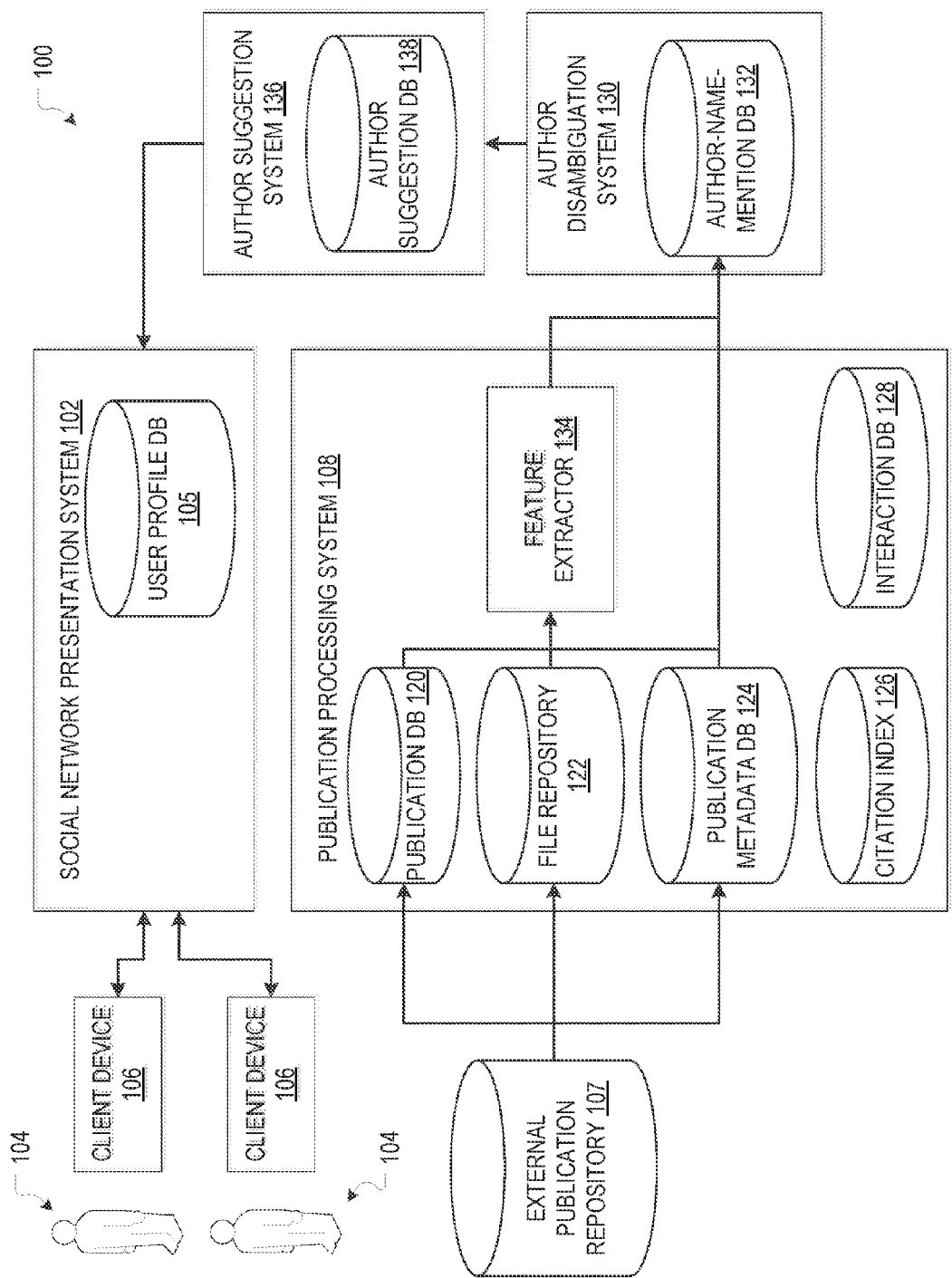
FIG. 1 is a block diagram that provides an overview of an example social-network and publication system in which author disambiguation and publication assignment in accordance with various embodiments may be used.

Described herein are computer-implemented systems and methods as well as computer program products for automatically disambiguating author names for a potentially large number (e.g., tens of millions) of publications so as to create clusters of author name mentions that are with high probability associated with a single author identity for each cluster. The term "author name mention," as used herein, denotes the listing of a particular author name on a particular publication. Accordingly, each publication has as many associated author name mentions as it lists authors, and the same author name on multiple publications corresponds to multiple respective author name mentions. An author name mention can be represented, in accordance herewith, by a data structure uniquely identifying the publication and the listed author name. The term "author identity," as used herein, refers to the (typically unique) representation of an individual—viewed as a potential author—within a computational system. In some embodiments described herein in more detail, author identities correspond to user accounts within a social-network and publication system. Author identities may, however, also simply be entries within an author database, or any other kind of representations for individual authors. The term "automatically" is herein generally understood to denote the execution of one or more computer-implemented algorithms operating on stored data without the need for direct human input. (Of course, that does not preclude the data upon which the algorithms operate from being input by humans, or the execution of the algorithms to be triggered by humans.)

In accordance with various embodiments, author name mentions (and the associated data structures) are clustered based on the author names themselves in conjunction with pairwise comparisons of feature sets associated with the author name mentions, the feature set for a given author name mention being derived from the associated publication and/or information about the name (e.g., statistical information about its usage within a publication repository). To limit the number of pairwise comparisons and, thus, the overall computational cost, author disambiguation in accordance with some embodiments is achieved in multiple successive stages: Initially, the author name mentions are grouped into disjunct (i.e., disjoint and distinct) "buckets" of similar names; in accordance with some embodiments, the threshold for name similarity is set low enough to encompass, with high probability, all author name mentions belonging to a given author identity within the same name bucket. Since name similarity is generally not a transitive property, the buckets will often include incompatible names. For example, since "John Smith" and "J. Smith" are similar and "Jane Smith" and "J. Smith" are similar, "John Smith" and "Jane Smith" may end up in the same bucket despite their mutual incompatibility. Within each bucket, author name mentions are sorted, based on the names only, into sets of pairwise mutually compatibility names. Such "compatibility sets" may include author name mentions belonging to different author identities and, conversely, author name mentions belonging to the same author identity may fall into different compatibility sets. Within each compatibility set, author name mentions are compared pairwise based on the associated feature sets, and author name mentions with a high level of feature similarity are assigned to the same cluster. In accordance with some embodiments, the threshold for feature similarity is set high enough to ensure, with high probability, that all author name mentions within the cluster belong to the same author identity (which need, however, not itself be known); each cluster is deemed to represent, in this sense, a disambiguated cluster author. Following the initial clustering, the clusters may be (e.g., iteratively) merged based on name compatibility and feature similarity. Beneficially, since there is no overlap in the data and operations associated with each name bucket, the determination of the compatibility sets can be performed in parallel for the various buckets, and can be distributed across multiple machines. Further, the determination of clusters within each compatibility set can be parallelized across compatibility sets.

Once the author name mentions associated with an initial corpus of publications have been clustered, author name mentions of newly added publications may be sorted into the existing clusters based on pairwise comparisons between the feature sets of that new author name mention and the feature sets of the other author name mentions within name-compatible clusters. If the new author name mention does not exhibit sufficient feature similarity with any of the existing clusters, it will form its own cluster. Further, initially separate clusters may be merged when sufficient feature similarity between their respective author name mentions is discovered. Clusters to be merged may have been separate initially because they were created at different times and/or from separate publication corpora, or because the available features were not sufficiently similar at the time of initial clustering, but become sufficiently similar as a result of newly available information and/or an adjustment of the similarity threshold. Clusters may also be merged, even if their feature similarity does not reach the required level for automatic merging, based on human input. Conversely to merging, author-name mentions may occasionally be taken out of a cluster and eventually re-assigned to another cluster to take new information (such as human input) into account.

In various embodiments, once clusters of author-name-mentions have been generated, at least some of these clusters are each assigned to a unique author identity (or, in other words, the disambiguated cluster authors are mapped to author identities), automatically and/or based on human input (e.g., as received from authors, co-authors, or administrative curators). For example, a user of a social-network and publication system may be presented with publications of author-name-mention clusters that match the user's name, and be given the opportunity to "claim" these publications as her own, or reject them, as the case may be. (In general, the match need not be an exact match, but may be based on name compatibility, or even allow for slight inconsistencies as may result from errors in ascertaining the user's name or the name associated with the cluster.) Further, a user presumed to have some knowledge of another user's publications (e.g., by virtue of a social connection or co-authorship) may be presented with publications from author-name-mention clusters matching that other user's name, and asked to confirm (or refute) that the other user authored these publications. In response to a confirmation, the publications may be presented to the confirmed author as a "user-to-user suggestion," or, if confidence in the confirmation is sufficiently high, automatically assigned to her.

The selection of publications presented to a user deemed a "candidate author," or the selection of a combination of publications and a candidate author presented to another user (e.g., a social contact of the candidate author or an administrator) as a potential suggester who knows the candidate author, may be determined fully or partially automatically. For example, publications (or one or more sets of publications associated with one or more author-name-mention clusters) to be suggested as authored by a given user may be identified with a name-based search over all unassigned clusters, optionally followed by "boosting" search results that are further linked to the user via various signals, such as overlap in email addresses or institutional affiliations associated with the publications or clusters and the user (e.g., as reflected in a user profile). Such search-based suggestions may be generated on the fly, e.g., upon sign-up of a new user to the system.

Alternatively or additionally, candidate matches between an author identity (e.g., a user account) and an author-name-mention cluster having compatible associated author names may be pre-computed, allowing for more sophisticated and computationally expensive evaluations of signals indicative of a match. Such signals include, for example, feature similarity between the feature sets of an unassigned author-name-mention cluster and one or more author-name-mention clusters already assigned to the candidate author. (Note that the feature-similarity threshold for declaring a candidate match to be confirmed by user input is generally lower than the feature-similarity threshold used in the automatic author-disambiguation process described above.) Further signals include "social signals" such as, without limitation, citations from confirmed publications of a candidate author to publications within the unassigned cluster, citations from publications assigned to social contacts of the candidate author (e.g., colleagues affiliated with the same institution or department, social-network contacts, or co-authors on (other) publications with confirmed authorship) to publications within the unassigned cluster, or confirmed co-authorship of publications within the unassigned cluster by social contacts of the candidate author. Multiple signals may be used in combination to identify candidate matches. For example, a "match score" may be calculated from one or more signals, e.g., by forming a weighted combination of the individual evaluated signals, or by cascading through the signals until a candidate match is found in accordance with a signal-based confidence threshold or until all available signals have been exhausted. In some embodiments, match scores are computed primarily based on features similarity between clusters already assigned to the candidate author and unassigned clusters, but the feature-set comparisons are limited to those name-compatible unassigned clusters for which any of a number of other signals evaluates positive (e.g., which contain publications that were cited or co-authored by social contacts of the candidate author). In various embodiments, when the match score (however computed) for a pair of an author-name-mention cluster and an author identity exceeds a certain specified "candidate-match threshold," user input may be solicited to confirm the match. Further, in some embodiments, a cluster can be automatically assigned to an author identity if the match score exceeds a specified "match threshold" (which is generally greater than the candidate-match threshold).

In the following, these and other features are described in more detail with reference to various example embodiments, in which user disambiguation in accordance herewith is incorporated into an online social-network and publication system. It will be evident to one skilled in the art that the features and characteristics of the different embodiments can be used in various combinations, and that not every embodiment need include all of the features disclosed. Further, while the present disclosure focuses on researchers and academic publications, certain aspects and features described herein may also be applicable to other user groups and types of publications. To name but a few examples, methods and systems in accordance herewith may find application in the publication of technical documents not necessarily generated in an academic context (but possibly, e.g., by researchers or other employees of companies, government institutes, etc.), such as whitepapers, product descriptions and manuals, slide presentations, etc.; works of literature, film, art, or music; news and other journalistic publications; meal recipes; etc. The embodiments described herein may be adjusted to accommodate such other application contexts. A person of skill in the art will appreciate that certain embodiments and features described herein work particularly well, and provide particularly strong benefits, if applied to publications that follow certain conventions regarding structure and content (like scientific papers), thereby lending themselves to the disambiguation analysis as described herein.

Example Social-Network and Publication System

FIG. 1 is a block diagram that provides an overview of an example social-network and publication system 100 in accordance with various embodiments. The system 100 includes a social network presentation (sub-)system 102 through which users 104 at respective client devices 106 interact with each other as well as with the content stored in the system 100. Users 104 (e.g., users A, B, and C) may register with the social network presentation system 102 by providing user-profile information, such as a name, institutional affiliation, contact information (e.g., email address), etc., and establishing network-access credentials such as, e.g., a user name (which may be, e.g., her email address) and password. The user-profile information may be stored within a user-profile database 105 of the social network presentation system 102. In some embodiments, eligibility to register as a user is based on certain conditions, such as academic credentials, and may be determined based on the user-provided profile information during sign-up. For example, eligibility to register may be established by providing an email address associated with an academic or research institution, a governmental agency dealing in research, or a private company with research and development activities recognized by the system; a comprehensive list of such institutions may be established, and extended from time to time upon request and/or as necessary, by a system administrator. Alternative factors that may render a user eligible to register include, for instance, authorship of one or more scientific publications known to the system 100 (e.g., co-authorship of a publication posted by an existing registered user 104), academic credentials proven to a system administrator in an application process, or receipt of an invitation to join the network by an already-registered user.

Once registered, a user 104 may have the ability, via a user interface of the social network presentation system 102, to upload her publications to the system 100. Alternatively or additionally, the system 100 may conduct a batch import of publications, e.g., by downloading them from openly accessible external third-party publication repositories 107 (e.g., as provided on the web sites of many universities), and subsequently allow its users 104 to link their publications to their profile by claiming authorship (or co-authorship). For instance, as part of the sign-up process, and at certain intervals thereafter, the system may automatically present the new user 104 with a list of publications that match the user's name, institutional affiliation, and/or other criteria, and request confirmation from the user that he is, indeed, an author of this publication. The selection of publications presented to the user may result from author disambiguation as described herein. Sometimes, to comply with the copyrights of third-party publishers, users 104 may upload final drafts of their works, but not the final typeset publication as it appeared in the third-party journal. Alternatively to uploading a publication directly to the system 100, a user 104 may enter bibliographic information and/or provide a link to an external web site where the publication is available (e.g., for purchase). Further, in some embodiments, a user 104 may input the publication contents in a structured form used by the system, instead of uploading a single full-text file for the publication.

The system further includes a publication processing (sub-)system 108 that forms the core of its back-end. In various embodiments, the publication processing system includes functionality for converting publications provided in any of a variety of unstructured or structured document formats (such as pdf, Word, Latex, XML, HTML, or other formats) into a common highly structured format internal to the system. In the internal format, a publication is represented in terms of its constituting elements—such as, e.g., paragraphs of text, images, tables, specially formatted text portions like citations, etc.; the level of granularity with which a publication is broken up into such elements (e.g., section vs. paragraph vs. sentence vs. word) may vary between embodiments. The individual elements may be stored as entries of a publication database 120, and the publication as a whole may be represented as an ordered list of its elements. Some of the elements, such as images, may have contents contained in individual binary files (which may not be amenable to further meaningful subdivision), which may be stored in a separate file repository 122 and linked to by the database entries of the respective elements. Alternatively or additionally to representing publications in terms of their constituent elements, full texts of the publications may be stored in the file repository 122. The publication processing system may further extract and store, in a database 124, metadata uniquely identifying each publication (such as the authors, title, and other bibliographic information); such metadata may serve to represent and locate publications within the system and establish connections between publications, people (e.g., authors), institutions, and/or other entities. In addition, the publication processing system may extract citations from the publications, and store them along with the other metadata in database 124 and/or in a separate (typically bi-directional) citation index 126. Further, in some embodiments, the system 100 facilitates tracking user interactions with the publications (at the level of the publications or of their constituent elements), and stores them in association with the publications and/or the users, e.g., in a separate interaction database 128 and/or in the publication database 120, the publication metadata database 124, and/or the user profile database 105.

Using the extracted metadata, the system 100 may provide search functionality that allows users to search for publications of interest based on, for example, the field of research, the author's name, or specific citation information. Further, after identifying the author of a publication, the publication processing system 108 may automatically insert a link to the author's public user profile within the social network presentation system 102. However, such functions require that the system 100 be able to attribute publications to their respective authors. For this purpose, the system 100 may include an author disambiguation (sub-)system 130 that resolves ambiguities by implementing the functionality described herein below. The author disambiguation system 130 may access the publication metadata database 124 to ascertain the authors listed on each publication, and generate, for each pair of a publication and an author name, an author-name-mention data structure. The author-name-mention data structures may be stored in an author-name-mention database 132. The system 100 may further include a feature extractor 134, implemented as part of the publication processing system 108 (as shown) or of the author-disambiguation system 130, that analyzes the publications and associated metadata to identify and extract features for subsequent use in author disambiguation. The extracted features may be stored directly in the author-name-mention data structures (along with the respective author names and publication identifiers), or as separate data structures that are linked to the author-name-mention data structures. The author disambiguation system 130 processes the author name mentions in multiple stages, ultimately generating author-name-mention clusters, based in part on the associated features, that represent individual authors.

The system 100 may solicit human input to verify the proper clustering of author name mentions and to link clusters to user profiles. For instance, in some embodiments, the clusters are provided as input to an author suggestions system 136 that causes them to be presented to users and/or system administrators for feedback. The author suggestion system 136 may, for example, present a new user upon registration with one or more clusters that are compatible with the new user's name (e.g., by inquiring, for a representative publication within the cluster, whether the user authored that publication) and/or satisfy other matching criteria, allowing the user to "claim" these clusters as his. Alternatively or additionally, the author suggestion system 136 may present publications associated with given author-name-mention cluster for a certain author, along with identifying information of a candidate author, to co-authors that have already claimed the publications, asking them to verify the author's identity. Publications (or clusters) associated with a given candidate author may be identified on the fly, or pre-computed and stored in an author suggestion database 138. In some embodiments, the author suggestion system 136 can also automatically assign author-name-mention clusters (and, thus, publications) to users if confidence in the automatically computed suggestion is high.

The depicted distribution of the various databases and functional modules across various subsystems is merely an example that serves to illustrate the functional relationships between data and the modules that generate and/or process them. Other configurations are possible. Further, it should be understood that the functionality and/or data of a given subsystem may in practice be distributed or replicated as multiple instances across multiple machines, and, on the other hand, that (instances of) different subsystems may reside on the same machine.

Author Disambiguation and Clustering

Figure 2:
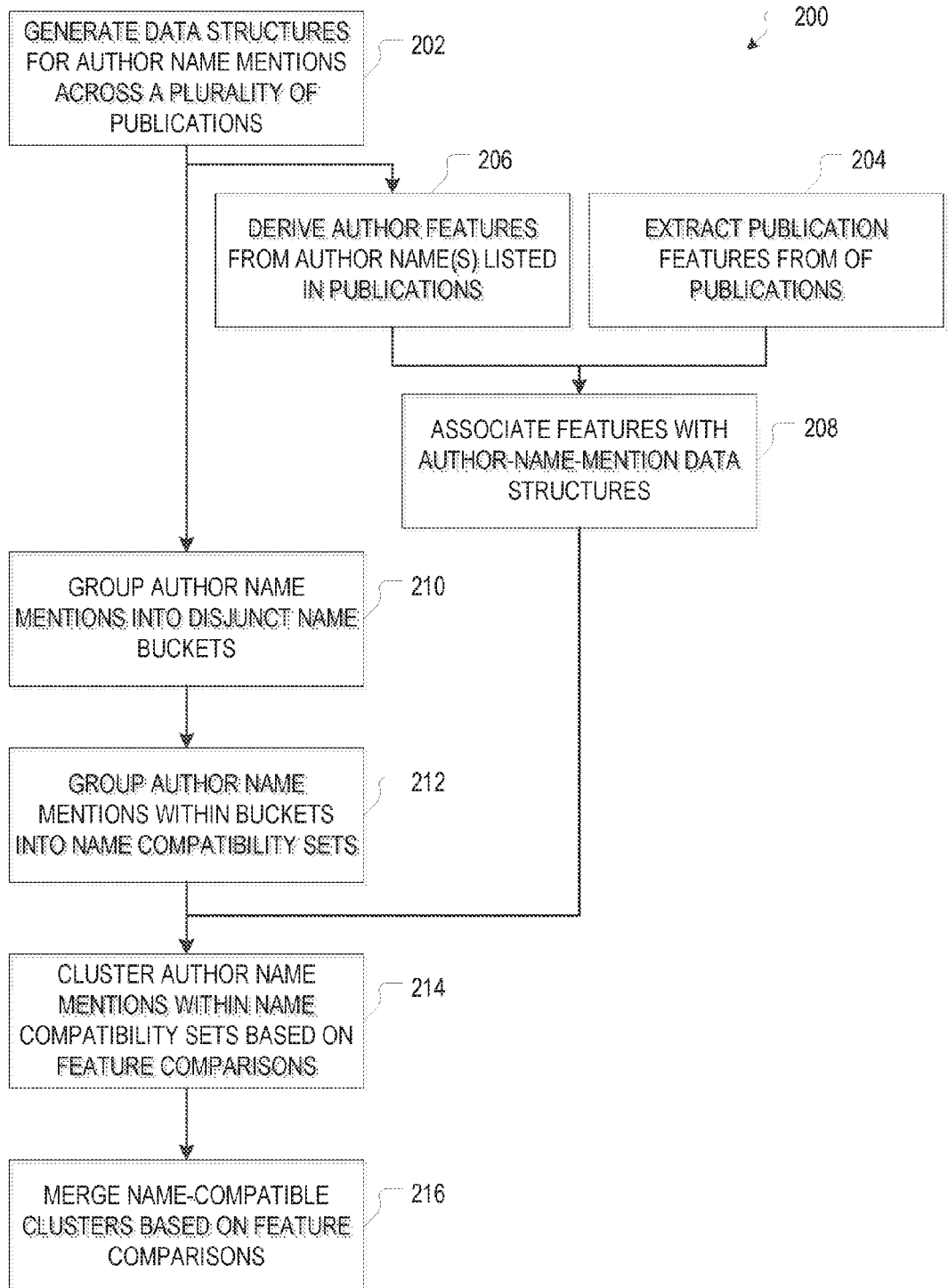
FIG. 2 is a flow diagram that illustrates an example method for disambiguating author names according to various embodiments.

FIG. 2 is a flow diagram that illustrates an example method 200, according to various embodiments, for disambiguating author names. Name ambiguities can arise when a single author publishes under multiple variants of his name and/or when instances of a single author name (or of multiple similar variants thereof) used on multiple publications refer to different individuals. The same name string may refer to different people, e.g., due to the fact that multiple people can share the same name. For example, "John Smith" can refer to a researcher in the USA, or a different researcher in Great Britain, as the name is quite common. Conversely, different name strings may refer to the same person, e.g., due to different naming conventions involving abbreviations, pseudonyms, the use or omission of middle names or initials, etc. For example, the "John Smith" in the USA may also publish under "John R Smith," "John Ryan Smith," "JR Smith," etc. Thus, the ability to accurately attribute work to individual authors may require disambiguating the authorship of publications. This is especially true for authors with commonly used names or certain culturally common surnames.

The method 200 for disambiguating authors begins, at operation 202, with generating an author-name-mention data structure for each author of each of a plurality of publications. Each author-name-mention data structure includes at the minimum the listed author name and a unique identifier of the publication within the system 100. Further, the author-name-mention data structure may specify the particular author's position within the list of authors on a given publication, the name bucket to which the author name mention belongs (as determined in operation 210, explained below), and/or a set of "features" derived from the author name and/or the publication that provide "signals" regarding authorship, or a link to such a feature set.

The feature set for an author-name-mention may include features extracted or otherwise mined, in operation 204, from the publication identified in the author-name-mention data structure (i.e., features extracted from the text or other contents of the publication, or features derived from information associated with the publication within the system 100, such as citation information as may be stored along with the publication in the publication database 120 or in the citation index 126). These publication features include, for example, the name of co-authors on the publication, citations to the publications, other publications cited by the publication, author-affiliated institutions and/or departments (as may be uniquely identified, e.g., using a graph of institutions that is maintained by the system 100 in conjunction with a raw string specifying the author's affiliation as included in the text of the publication), the city and country locations of the author-affiliated institutions and/or departments, the raw affiliation string (which may be used, e.g., if the affiliated institution cannot be identified from the institution graph), the name and date(s) of a conference at which the publication was presented or published, the publication abstract, the publisher name, journal information (e.g., ISSN or journal name), the date of publication, publication keywords, the publication title or title keywords, the account identifier of a user account through which the publication was created within the system, author email addresses, contact information, etc.

The features associated with an author name mention may further include features derived, in operation 206, from the author names listed on the publications, including information about the authors and co-authors as obtained, e.g., from public user profiles within the social network presentation system once an author name mention has been assigned to a particular user, as well as information about the listed author and co-author names themselves. These author features include, for example, information about a degree (or level) of name specialization (distinguishing, e.g., a complete name like "John Ryan Smith" from an abbreviation like "J Smith"), author name rareness (e.g., as measured in terms of the frequency with which the listed name occurs among the publication within the system 100), author seniority within the paper (which may be derived from the author name position in conjunction with knowledge as to the order in which authors are listed, e.g., whether a professor supervising the main author's work is listed first or last), email address and homepage of the authors, co-author names or identities (the latter being available, e.g., if a co-author has already claimed the publication as his), rareness of co-author names (measured in the same manner as the rareness of author names), data associated with co-authors (e.g., email addresses, homepages, departments, institutions, cities, countries), etc.

The publication features and author features are associated, at operation 208, with the respective author-name-mention data structures. In some embodiments, each author-name-mention data structure directly stores a feature set including its associated author and publication features. In other embodiments, some or all of the features are stored in separate data structures, which are, however, explicitly or implicitly referenced in the author-name-mention data structures. For example, publication feature sets may be stored in the publication metadata database 124 along with other metadata of the respective publication from which they were extracted; in this case, the author-name-mention data structures implicitly references the respective publication feature sets by virtue of identifying the publications.

The method 200 involves identifying, in multiple stages, clusters of author name mentions (and associated data structures) that likely correspond to the same author identity. At operation 210, the author name mentions are grouped, at a first, higher level of granularity, into distinct and disjoint (i.e., non-overlapping) name buckets according to a rule that ensures that multiple variants of the same name generally land in the same bucket, at the cost of potentially (and, in practice, likely) including different names, if sufficiently similar, in the same bucket. As a consequence of this approach, author name mentions associated with a single author will generally fall within the same bucket (at least absent a complete name change of the author, e.g., due to marriage). In one embodiment, name buckets are generated based on the first initial and the last name of authors. For example, the author name mentions for "John Smith," "JR Smith," and "Jane Smith" are all grouped into the "J Smith" bucket. Similarly, the author name mentions for "John Doe," "Janet Doe," and "Jane Doe" are all grouped into the "J Doe" bucket. This grouping keeps author name mentions that might be associated with a single person in the same bucket while separating out some incompatible names. For example, "JR Smith" and "John Doe"—clearly two different individuals—are placed into two different name buckets.

Next, at operation 212, author name mentions within each name bucket are grouped, based on comparisons of the author names only (i.e., without regard to the feature sets), into name compatibility sets, i.e., sets of names that are pairwise compatible in that they might belong (although they do not necessarily do belong) to the same person. Author names are thereby grouped at a second, finer level of granularity.

For instance, continuing the above example, the author name mentions for "John Smith" and "Jane Smith" may be separated out into two different compatibility sets since first names John and Jane indicate two different individuals. The author name mentions for "JR Smith" could refer to John, Jane, or some other person. In accordance with some embodiments, "JR Smith" would therefore be placed in the compatibility sets for both "John Smith" and "Jane Smith," resulting in overlap between these compatibility sets. In other embodiments, described in depth below with respect to FIGS. 4 and 5A and 5B, each compatibility set is confined to names that are not only compatible, but also have the same degree and type of name specialization. For example, "John Smith" and "JR Smith," though compatible, would be assigned to different compatibility sets because they have different information content about the names (first and last name vs. first and middle initials and last name). By contrast, "Jane Doe" and "Janet Doe," though not identical, may be deemed compatible because they are similar enough to warrant a more in-depth comparison, and also have the same degree and type of name specialization; accordingly, they may be assigned to the same compatibility set.

At operation 214, author-name-mention clusters are generated within each name compatibility set based on similarities between their associated feature sets. In various embodiments, each author name mention within a given compatibility set is compared pairwise against all other author name mentions within the compatibility set. A score for the similarity between two feature sets (associated with two respective author name mentions) may be computed by quantifying the similarity between each pair of features of the same type (e.g., within a range between zero and one, where zero indicates complete dissimilarity and one indicates perfect likeness), and then summing over the feature-level similarity values, with weighting factors that capture the relative degrees to which the various features signal common authorship, as may be determined heuristically and/or based on empirical information. For example, if the email addresses in the feature sets of both an author name mention for Janet Doe and an author name mention for Jane Doe are jdoe@MIT.edu, both author name mentions very likely correspond to the same author, and the feature-level similarity value (which, on a scale from zero to one, would be one in this case) would be multiplied with a large weighting factor and therefore contribute significantly to the overall similarity score. Matches between co-authors, similarity in titles, and proximity in publication dates would receive lower, but still appreciable weights, as authors tend to repeatedly publish with the same co-authors, use similar titles, and publish in bursts rather than at more evenly spaced time intervals. Overlap between keywords, while still some indicator of common authorship, is generally a much weaker signal, and may therefore receive a very low weight, or be omitted from the features set altogether (or used only if the better indicators cannot be ascertained for a publication).

The computed feature-set similarity scores between pairs of author name mentions can be sorted in descending order, and for each pair scoring above a predetermined threshold, the author name mentions of that pair may be grouped into the same author cluster. In this manner, clusters of author name mentions that are likely attributable to and represent the same individual are formed. The threshold for assigning the author name mentions within a pair to the same cluster may be set based on a desired trade-off between false positives and false negatives. The higher the threshold is set, the less likely it becomes that author name mentions belonging to different authors are erroneously grouped into the same clusters (false positives), but the more likely it also becomes that author name mentions belonging to the same author fall into different clusters (false negatives). Since false negatives are often more easy to deal with than false positives, various embodiments set the threshold high, and, as a consequence, an individual author is typically represented by multiple clusters. These clusters may subsequently be merged, at operation 216, based on feature comparisons between name-compatible clusters and/or based on additional information, such as user feedback and/or assignment of different clusters to the same author-identity (e.g., when the same user claims different clusters of author name mentions as his).

Once a cluster has been created (whether this be, e.g., the initial cluster resulting from operation 214 or the clusters ultimately resulting from cluster merging based on feature comparisons), one author name within each cluster—generally one of the more informative names within a name hierarchy—may be selected as a label for the cluster. For example, "Janet R Smith" may be chosen over "Jane Smith." Alternatively, in some embodiments, an entirely new author name that combines information from multiple author name mentions within the cluster may be created to serve as the label. For example, if cluster includes author name mentions for "J R Smith" and "Janet Smith," the label may be "Janet R Smith." Further, in some embodiments, at least one author name mention within each author cluster can be selected to be an author-name-mention cluster representative. This cluster representative may, for instance, be the author name mention that has the most data in its feature set. Alternatively, features from multiple author name mentions within a single cluster may be aggregated, summed, averaged, or otherwise combined to generate an aggregated "synthetic" cluster representative. For example, the names of co-authors on the individual publications may be aggregated across all publications within the cluster into a (non-duplicative) set of co-authors. As another example, the impact factors of individual publications may be added up to determine an overall impact factor of the author. Similarly, the number of citations to each publication may be added to obtain the total number of citations that the author received. In some embodiments, one or more of the features of the aggregated cluster representative are computed from corresponding individual features of the author name mentions within the cluster by methods more sophisticated than mere aggregation, summing, or averaging. For example, the feature sets of individual author name mentions may include sets of keywords, such as significant words directly extracted from the publication (e.g., by first eliminating stop words (like articles, prepositions, or other frequently occurring words that carry little topic-specific meaning), and then identifying words based on the frequencies of their occurrence within the publication at issue and within the publication corpus as a whole), or topic keywords derived from the extracted keywords using a suitable topic-extraction algorithm. The sets of originally extracted keywords and/or of derived topic keywords may be aggregated across all publications within a cluster and fed back into the topic-extraction (or a similar) algorithm to determine topic keywords associated with the cluster as a whole, which may then be stored in the feature set of the cluster representative. Beneficially, the aggregated cluster representative can have more data in its associated feature set than any individual author name mention within the cluster.

The determination of clusters in multiple stages as described above provides the benefit of reduced computational cost and complexity (compared, e.g., with straight feature-comparison-based clustering from the outset), and addresses scalability issues by avoiding the need for comparisons between all pairs of author name mentions. In particular, because author name mentions within any particular bucket are already disambiguated relative to author name mentions in other name buckets, author name mentions within any one name bucket are not compared to author name mentions within other name buckets. Further, during the initial clustering (operation 214), pairwise comparisons are performed within the compatibility sets, not between compatibility sets, even though different compatibility sets may have author name mentions belonging to the same individual. Two or more name-compatible clusters can then be merged based on far fewer feature comparisons than would generally be involved in pairwise comparisons between all author name mentions within a bucket. The computational-cost savings can be further increased by performing feature comparisons between clusters at cluster-level (rather than at the level of individual author name mentions), e.g., based on the cluster representatives.

Once the author name mentions associated with a given corpus of publications have been disambiguated into a plurality of clusters, any new publications subsequently added to the corpus may be dealt with incrementally—rather than repeating the clustering process for the updated corpus, the author name mentions for the newly added publications may simply be sorted into the existing clusters, or, if they are too dissimilar, into newly created clusters. This can be done for each individual newly added author name mention. Alternatively, the new publications can be collected in a second corpus, and their associated author name mentions can be clustered separately and thereafter be merged with the already existing clusters. In determining whether a new author name mention is to be assigned to a given existing cluster, the feature set of the new author name mention generally need not be compared against the feature sets of all author name mentions within the existing cluster, but may instead be compared against a single cluster representative. Similarly, in determining whether a newly created cluster is to be merged with another cluster, the comparison can be made been feature sets of two respective cluster representatives. This approach reduces the number of comparisons to be performed and, thus, the computational cost of the clustering process. In fact, even during the process of clustering the author name mentions of the original publication corpus, computational-cost savings can be achieved by avoiding comparisons of author name mentions yet to be disambiguated against individual already disambiguated author name mentions, and instead performing the comparisons of the still ambiguous author name mentions against the cluster representatives of entire disambiguated clusters.

Because each cluster includes author name mentions representing a unique disambiguated author, users may be allowed to claim clusters as theirs and thereby link the claimed clusters to their respective user profiles within the social network presentation system 102. Unclaimed clusters within each name bucket may be re-clustered from time to time (e.g., on a predetermined schedule, such as on a certain day every week), for instance to expand and refine the clusters based on new publications and/or new information. Clustering decisions need not be automatically reflected within the social network presentation system 102, as this would result in continual updates with the system as authors claim clusters or upload new publications. Rather, the social network presentation may be updated on a predetermined schedule via, for example, a stop-the-world algorithm that merges new clustering decisions into the current state of clusters within the social network presentation system. Any further clustering decisions performed after that update are reserved until the next scheduled update.

Figure 3:
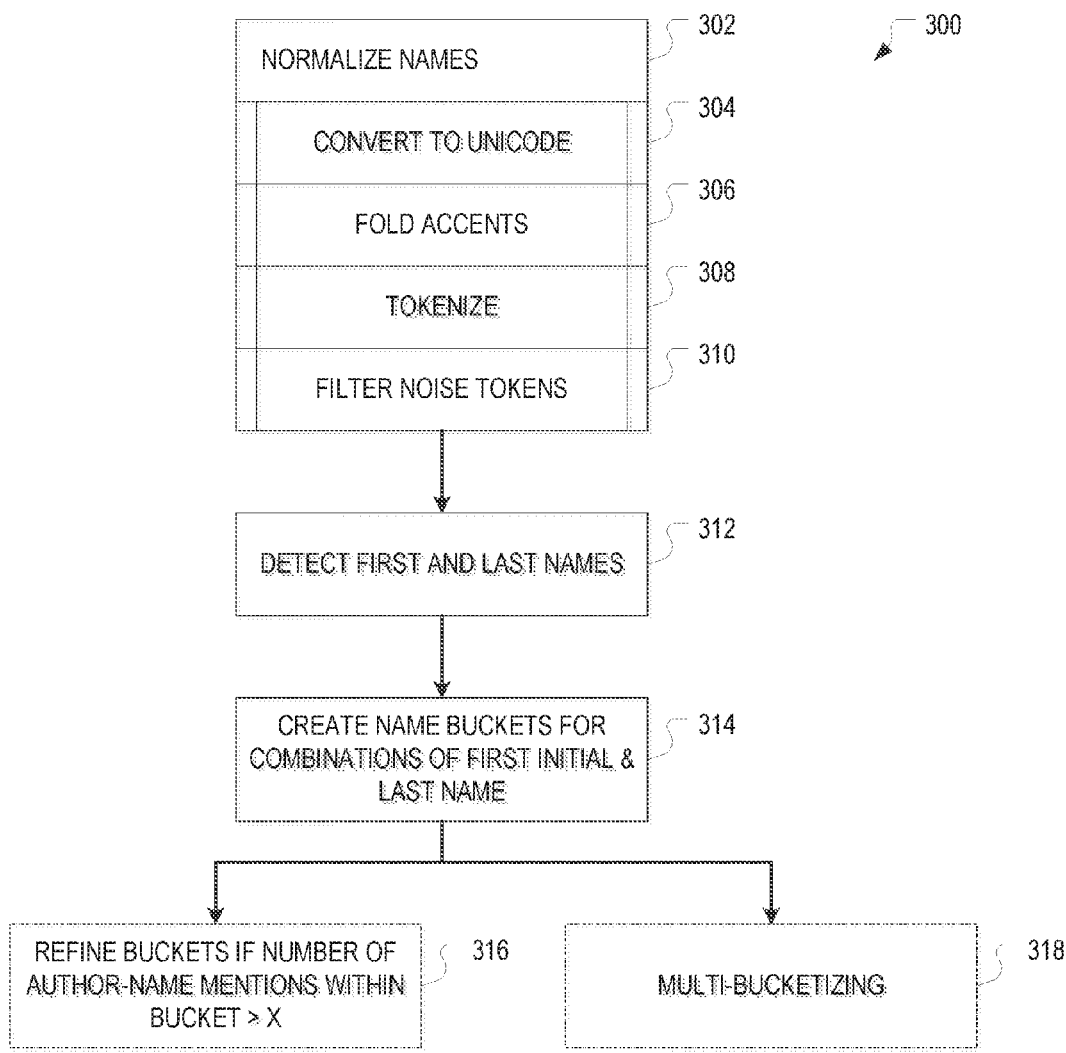
FIG. 3 is a flow diagram that illustrates an example method for grouping author name mentions into name buckets, in accordance with various embodiments.

Example embodiments of various operations of the method 200 are described in more detail in the following. FIG. 3 illustrates an example method 300, in accordance with various embodiments, for grouping author name mentions into name buckets ("bucketizing") based on the first initial and last name (operation 210). Name bucketizing is generally applicable to both structured and unstructured data. For the latter, the method 300 involves a series of preparatory operations 302 directed to normalizing author names, followed by the detection of the author's first initial and last name within the normalized name string (operation 304). Name normalization generally serves to render names comparable by distilling relevant name components and features and disregarding irrelevant ones. More specifically, in accordance with various embodiments, name normalization (operation 302) involves converting the names, which may originate from a wide range of sources all over the globe, to a common standard for character and text encoding (operation 304), such as Unicode or ISO/IEC 8859, and/or a common character set (e.g., the Latin alphabet). Unicode characters may further be mapped to ASCII equivalents by "folding accents" (broadly understood to include omitting diacritics as present, e.g., in French, Czech, and other languages, transliterating Umlaute (e.g., to "oe," "ae," and "ue"), and performing similar mappings) (operation 306). The names may then be tokenized (operation 308) to identify, e.g., first name, middle name or initial, last name, titles (e.g., Dr., Prof., Sir, . . . ), qualifiers (e.g., Jr., III), degrees (e.g., Ph.D., M.D., B.A. etc.) or other components used in names. The tokenization may be configured to keep logical names, or groups of names that collectively refer to an entity distinct from the individual names (e.g., "Myers-Briggs"), together. After tokenization, noise tokens (i.e., frequently occurring tokens such as titles, qualifiers, and degrees) may be filtered out (operation 310) for bucketizing purposes. (They may be retained, however, in the feature sets associated with the author name mentions.) Potential noise tokens for this operation may be identified by frequency and co-occurrence analysis of tokens. The filtering may employ suitable heuristics to distinguish between true noise tokens and other commonly occurring name patterns (e.g., between the title "Dr." and the initials DR). Depending on the names initially supplied to the bucketizing process, one or more of these normalization operations may be omitted.

Following these normalization procedures (or any combination thereof), the first and last name may be extracted from each name string (operation 312). This extraction is generally based on suitable heuristics, such as common patterns and conventions for representing names. For example, a name string including two fully spelt out parts may be split up into first name and last name based on punctuation: in "Mark Ryan," the first name is likely "Mark" and the last name "Ryan," whereas the opposite is true for "Mark, Ryan." As another example, maiden names may be detected based on the pattern "née." Single tokens can be assumed to be the author's last name. Rules can be programmed manually, or derived automatically, e.g., using a machine-learning algorithm trained on a corpus of structured frequent first and last names.

Once first and last names have been identified, the author name mentions can be grouped into buckets corresponding, e.g., to distinct combinations of a first initial and last name (operation 314). (This default rule is based on the observation that, except in rare cases, at least first initial and last name are available, allowing practically all names to be bucketed.) The names identifying the buckets may be normalized in some manner, e.g., by lower-casing. In certain embodiments, (optional) post-processing steps are applied to modify the default bucketing. Since name buckets are means for reducing pairwise comparisons between author name mentions and facilitating parallelization and distribution, certain embodiments split up buckets when the bucket size exceeds a specified threshold (operation 316), e.g., by bucketizing based on increasing degrees of name specialization. For instance, if the bucket "John Smith" is too large, smaller buckets corresponding to the combination of "John," a middle initial, and "Smith" may be formed. The rule or level of name specialization employed may be adapted to the bucket size. As another post-processing example, rare names that are known synonyms or known to be related (based on sources outside the author disambiguation process) may be placed in multiple buckets (operation 318). This requires a post-processing step after the clustering to merge clusters corresponding to the related rare names that have been formed in different buckets.

Figure 4:
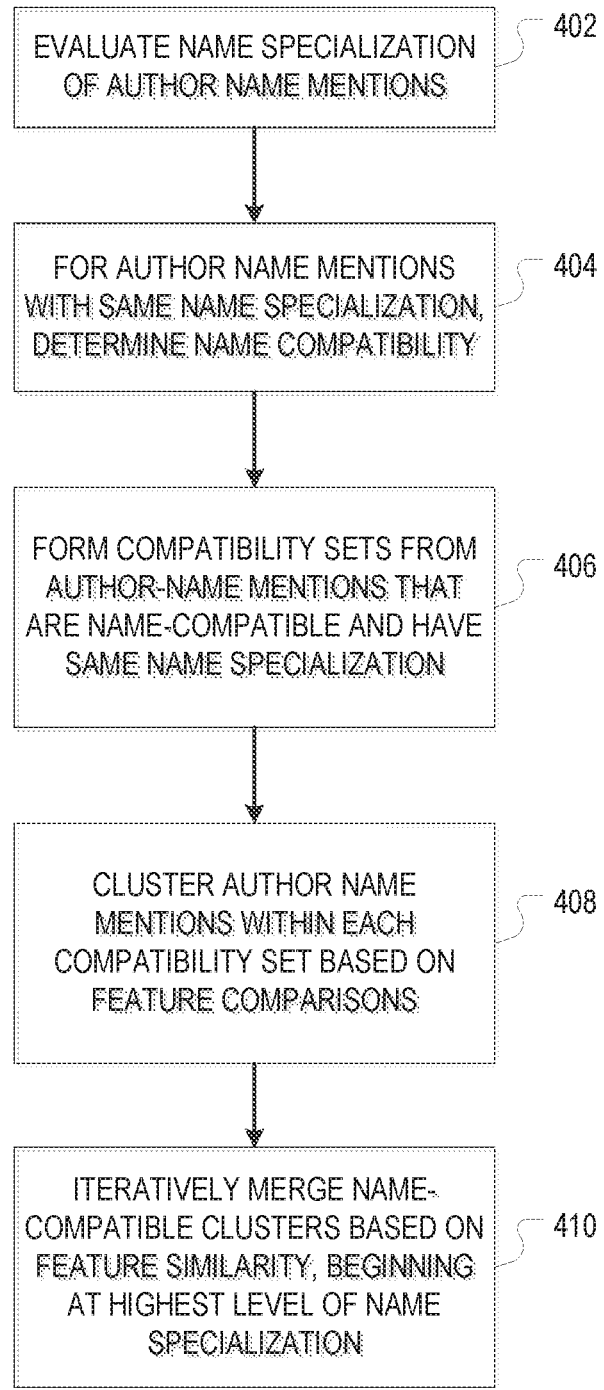
FIG. 4 is a flow diagram illustrating an example method for forming clusters within a name bucket, in accordance with various embodiments.

FIG. 4 is a flow diagram illustrating an example method 400, in accordance with various embodiments, for forming clusters within a name bucket. The method 400 involves evaluating the degree of name specialization (hereinafter also "specialization level"), and in various embodiments also the type of name specialization, for each author name mention (operation 402). For example, a complete name consisting of first name, middle name, and last name may be assigned specialization level 0 (corresponding to the highest degree of name specialization); a name consisting of first name, middle initial, and last name may be assigned specialization level 1; a name consisting of first name and last name or a name consisting of first and middle initials and last name may be assigned specialization level 2, and a name consisting of first initial and last name may be assigned specialization level 3. Within specialization level 2, two types of name specialization (first name+last name vs. first initial+middle initial+last name) can be distinguished. It will be readily appreciated that fewer, more, or different levels and types of name specialization can be defined, depending, e.g., on the types of name patterns present in the document corpus at issue and/or on the cultural context. Adjustments in the definition of levels and types of name specialization may be made, e.g., to apply name disambiguation in accordance herewith to non-Western cultures.

Name compatibility is then be assessed between any two names that have the same level and (if applicable) type of name specialization (operation 404); name compatibility is typically a binary metric, i.e., two names are either compatible or not. (A degree of name similarity measured on a discrete or continuous scale can nonetheless be evaluated and used, e.g., as part of feature similarity.) Compatibility sets are formed by assigning author name mentions with mutually compatible names of the same level and type of name specialization to the same set (operation 406). Name compatibility among names of the same degree and type of name specialization is generally a transitive property; thus, if two names are each compatible with a third name and therefore placed in the same compatibility set, they are also compatible with each other, ensuring pairwise compatibility within the compatibility set.

Within each compatibility set, all pairs of author name mentions are compared based on their associated feature sets, and author name mentions with sufficient feature similarity are grouped into a cluster (operation 408). For example, feature similarity for any pair of author name mentions can be scored (as described above with respect to FIG. 2), the scored author name mentions ranked, and the highest-scoring pairs (e.g., a fixed number of pairs, or pairs with scores above a fixed threshold) all placed in the same cluster. This process may, and often will, result in multiple clusters arising out of the same compatibility set, corresponding to different author identities. Across different compatibility sets, multiple clusters belonging to the same author identity may be formed. To merge these clusters, feature-similarity comparisons between any two clusters that have compatible associated author names are performed (operation 410). In accordance with various embodiments, cluster merging is an iterative process that begins with the clusters at the highest level of name specialization and proceeds to less and less specific names.

Figure 5C:
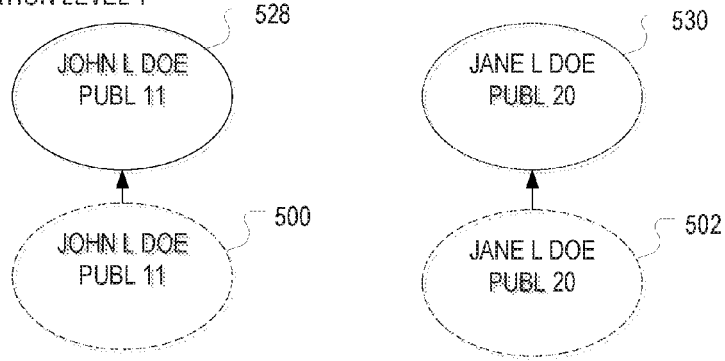
Figure 5C:
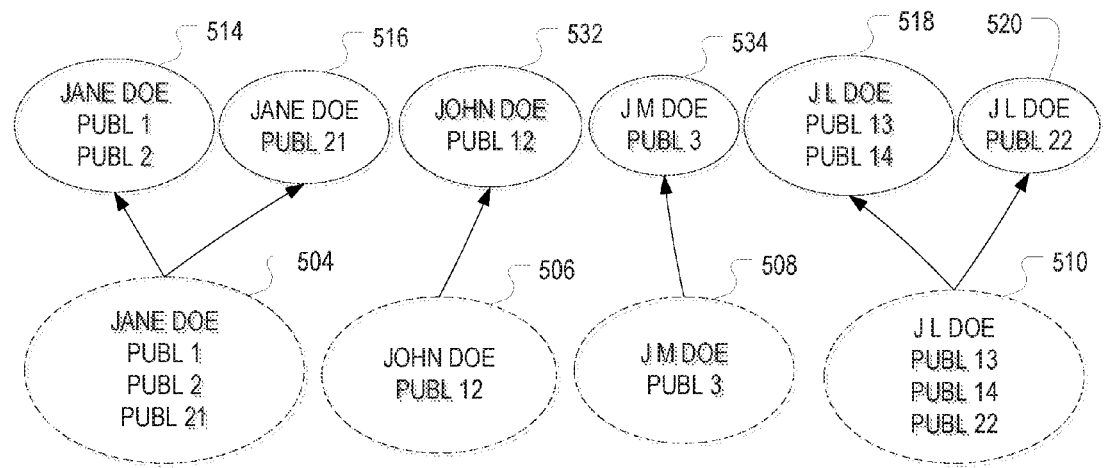
Figure 5C:
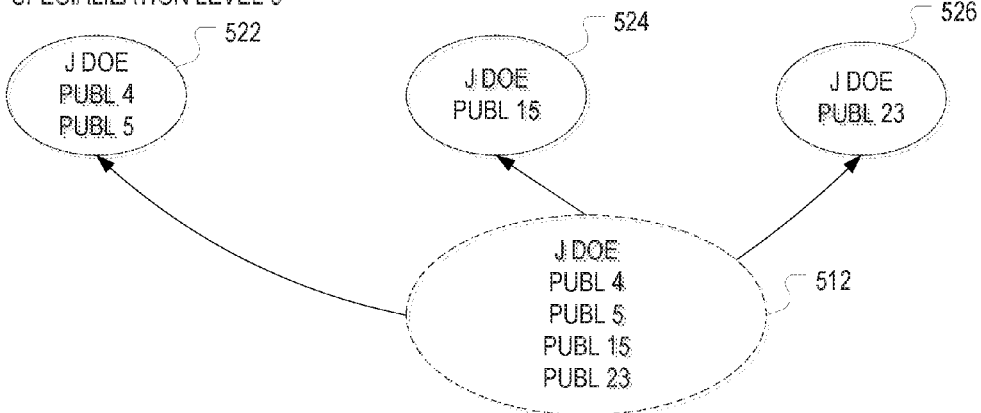

FIGS. 5A-5F are schematic diagrams illustrating the forming of compatibility sets and clusters, in accordance with various embodiments, for an example set of author name mentions. As shown in FIG. 5A, the example set includes fourteen publications by three different authors: Jane M. Doe (author of publications 1-5), John L. Doe (author of publications 11-15), and Jane L. Doe (author of publications 20-23); the author name appearing on each of the publications is listed next to the respective publication number. Of course, at the beginning of the author-disambiguation process, the relationships between authors and publications are not known to the system. (Further, unlike the publication numbers depicted for purposes of referencing the publications in this example, the publication identifiers used by the system are generally not consecutive for publications by the same author.)

FIG. 5B shows compatibility sets into which the fourteen publications are grouped based on the listed author names. At the highest level of name specialization (in this case specialization level 1, since none of the publications lists the full author name including the middle name), there are two compatibility sets 500, 502 each including only a single publication. At the next-highest level (specialization level 2), four compatibility sets 504, 506, 508, 510 are formed for two different types of name specialization. Here, compatibility sets 508, 510 for "J M Doe" and "J L Doe" are each individually name-compatible with both compatibility set 504 for "Jane Doe" and compatibility set 506 for "John Doe," but form separate sets since "J M Doe" and "J L Doe" cannot be both compatible with the same one of compatibility sets 504, 506 ("Jane Doe" or "John Doe"), nor can either of "J M Doe" or "J L Doe" be (simultaneously) compatible with both "Jane Doe" and "John Doe." At the lowest specialization level (level 3), there is only one compatibility set 512 for "J Doe."

FIG. 5C shows how the various compatibility sets (indicated by dashed lines) are split up into different clusters (indicated by solid lines). This clustering is performed based on feature similarity, which, for illustration purposes, is assumed to be high for any pair of publications by the same author. (Of course, in practice, publications by a single author may be sorted into multiple clusters, at least initially, and possibly merged at a later stage as information about each cluster increases.) Accordingly, as can be seen, the compatibility 504 set for "Jane Doe" is split into two clusters 514, 516; the compatibility set 510 for "J L Doe" is split into two clusters 518, 520, and the compatibility set 512 for "J Doe" is split into three clusters 522, 524, 526. The compatibility sets 500, 502, 506, 508 each include only one publication, so they constitute trivial clusters 528, 530, 532, 534.

Figure 5D:
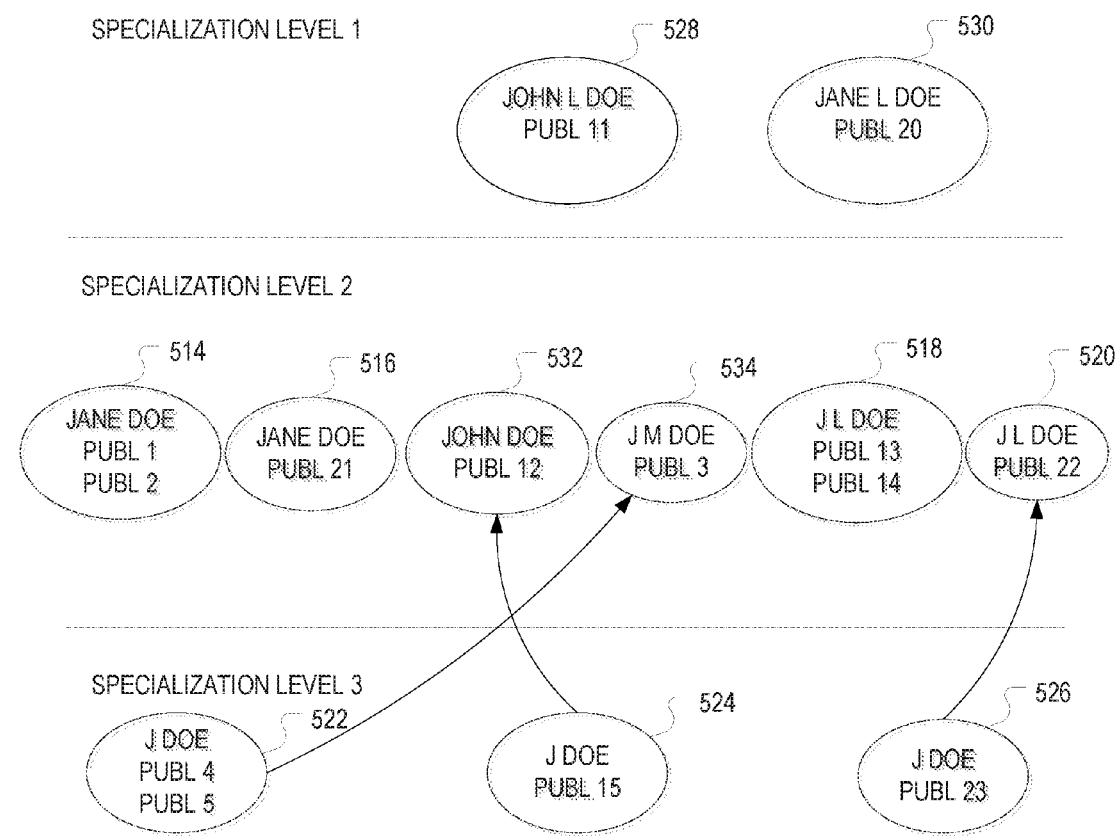
Figure 5E:
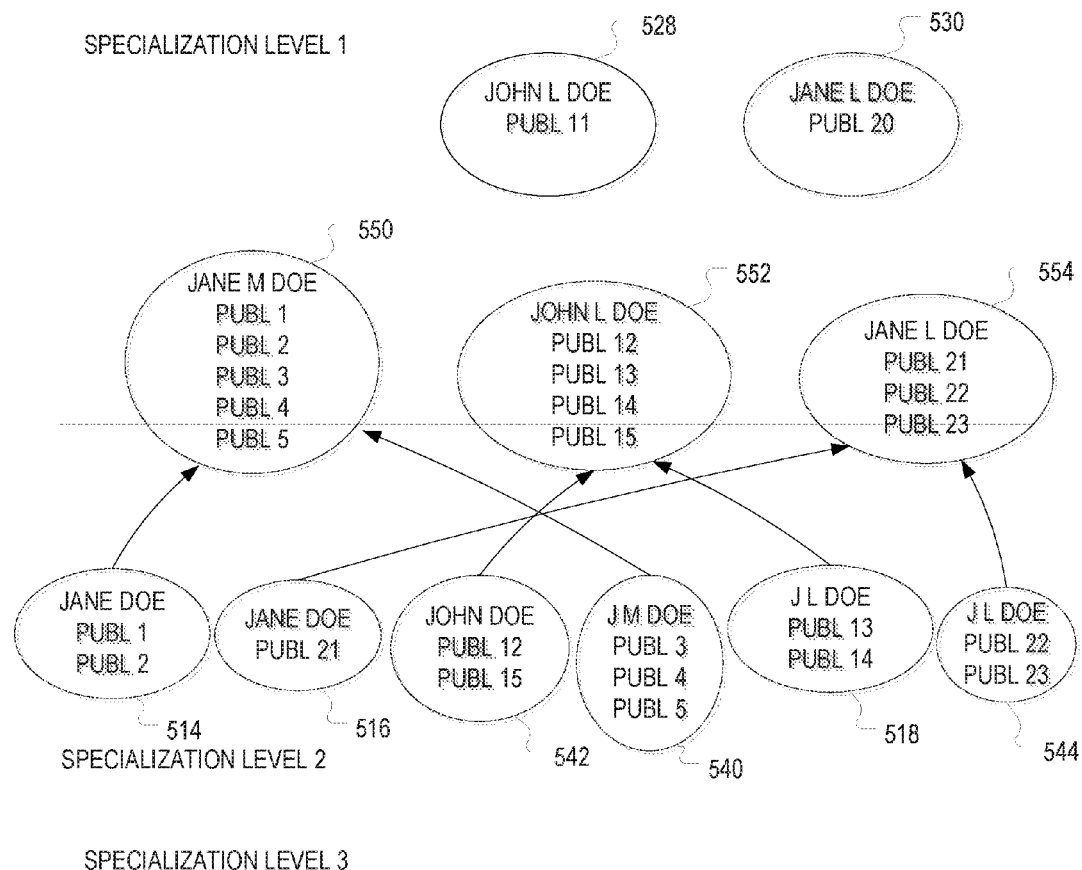
Figure 5F:
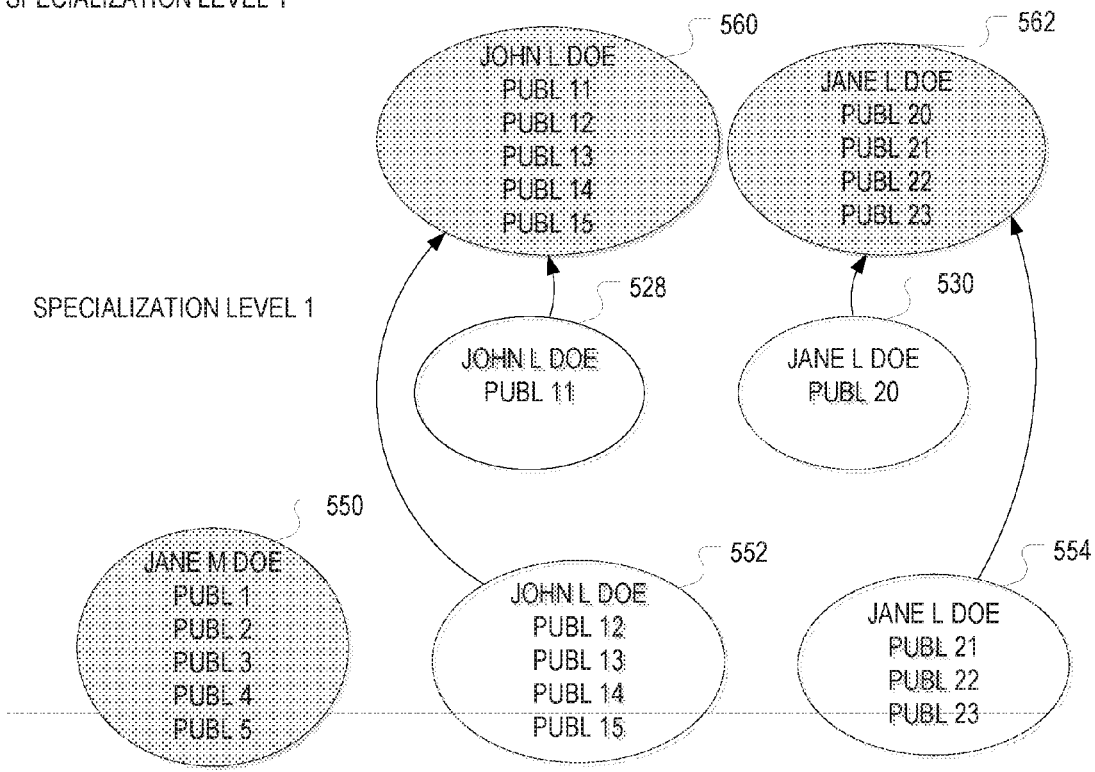

FIGS. 5D-5F show how the initial clusters of FIG. 5C are merged iteratively, going from lower levels of specialization to higher levels of specialization, based on feature similarity between name-compatible clusters of different types or degrees of name specialization. Since all clusters at specialization level 3 are of the same type, the merging process begins with comparisons between clusters at specialization level 3 and specialization level 2. Each of the clusters 522, 524, 526 in specialization level 3 is name-compatible with, and will therefore be compared with, each of the clusters 514, 516, 518, 520, 532, 534 in specialization level 2, and will be assigned to the cluster in level 2 with which it has the highest degree of feature similarity. For cluster 522, a high degree of feature similarity will be found with clusters 514 for "Jane Doe" and 534 for "J M Doe" (since, as we know from FIG. 5A, publications 4 and 5 in cluster 522 are from the same author as publications 1 and 2 in cluster 514 and publication 3 in cluster 534). Assume, for the sake of illustration, that the highest similarity is between clusters 522 and 534, such that these clusters are merged into a new cluster 540, as illustrated in FIGS. 5D and 5E. Similarly, assume that cluster 524 (including publication 15) is merged with cluster 532 (including publication 12) into a new cluster 542, and cluster 526 (including publication 23) is merged with cluster 520 (including publication 22) into a new cluster 544. Following these mergers, specialization level 3 is empty. Next, merging takes place within specialization level 2, between clusters of different types of name specialization. Here, as illustrated in FIG. 5E, name-compatible clusters 514, 540 for "Jane Doe" and "J M Doe" are merged into a larger cluster 550 based on feature similarity of publications 1 and 2 to publications 3, 4, and 5. By combining the name information of the two clusters 514, 540 being merged, the larger cluster 550 can be associated with the name "Jane M Doe" and, thus, moved up into the specialization level 1. Similarly, clusters 542, 518 for "John Doe" and "J L Doe" are merged, based on feature similarity of publications 12 and 15 to publications 13 and 14, into a larger cluster 552 having the associated name "John L Doe," and clusters 516, 544 for "Jane Doe" and "J L Doe" are merged, based on feature similarity of publication 21 to publications 22 and 23, into larger cluster 554 with the associated name "Jane L Doe." As a result of the cluster mergers at specialization level 2, that level is now empty, but name-compatible clusters exist at specialization level 1. Accordingly, as shown in FIG. 5F, the two clusters 528, 552 for "John L Doe" are merged into a larger cluster 560, and the two clusters 530, 554 for "Jane L Doe" are likewise merged into a larger cluster 5562, again based on feature similarity. The resulting clusters 550, 560, 562 are consistent with the actual authorship of the fourteen publications as shown in FIG. 5A.

Figure 6:
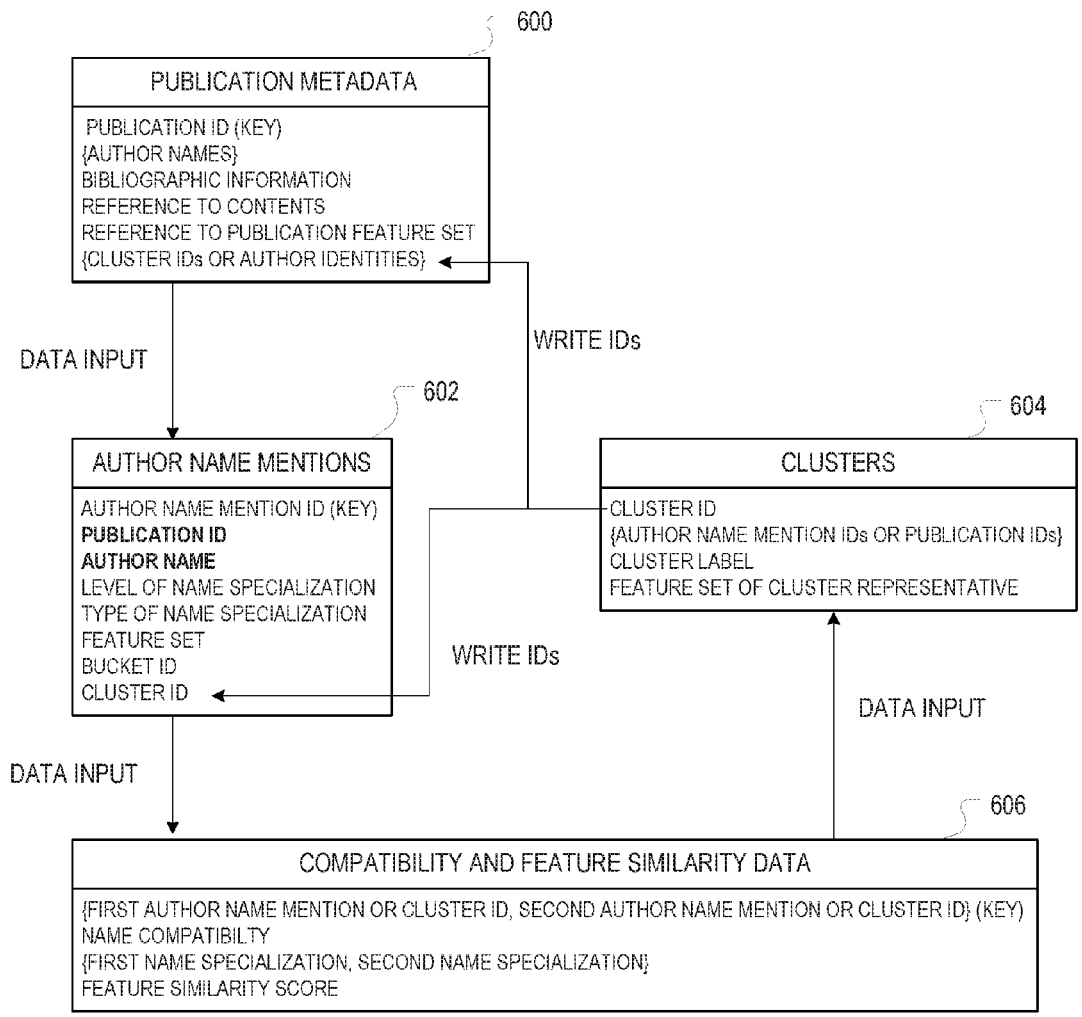
FIG. 6 is a simplified depiction of an example data schema illustrating various data items generated or used in author disambiguation in accordance with various embodiments.

FIG. 6 depicts, in a simplified manner, an example data schema illustrating how various data items generated or used during author disambiguation in accordance with various embodiments can be stored (temporarily or persistently) and cross-referenced. The data schema includes a plurality of tables for different types of entities, such as publications, author name mentions, and clusters, as well as tables for compatibility and feature-similarity data for pairs of publications and/or clusters; these tables may be stored in a database and/or temporarily (e.g., if generated on the fly and deleted upon use) in memory. (Further, the term "table," as is used herein, is not intended to be confined to base tables in a database, but is meant to encompass views generated from multiple base tables, or other virtual tables.)

In the example schema shown, publication data is stored in a publication metadata table 600, in which a unique (e.g., numeric or alphanumeric) identifier for each publication serves as the key. The publication metadata table stores various attributes for each publication, which may include, e.g., an array of the author names as listed on the publication, further bibliographic information (such as the publication title, the date of publication, the publication venue, etc.), as well as references (e.g., in the form of pointers, database references, file names, links, etc.) to the publication contents (e.g., the full-text of the publication or a structured representation of the publication (e.g., in the form of publication elements)) and/or to a publication feature set derived from and associated with the publication. Note that the publication feature set may be inherently contained in the metadata; a separately stored feature set may be beneficial if the features include a large number of derived features that are used primarily for author disambiguation and not needed for other uses of the publication metadata (such as, e.g., publication search). Following author disambiguation, the publication metadata may further include references to the clusters corresponding to the listed authors (which are to be distinguished from the names themselves) and/or to actual author identities (e.g., user accounts) upon assignment thereof to the clusters.

The depicted data schema further includes a table for author name mentions 602 (whose rows are author name mention data structures), which may use a unique author-name-mention identifier as the key, and store at least the publication identifier and author name as attributes. Alternatively, unique combinations of a publication identifier and the author name (or a numeric identifier therefor) may be used as the key in the author-name-mention table 602. The author-name-mention table 602 may further include attribute fields for the level and type of name specialization of the author name, a reference to the associated feature set (which, in turn, may include the publication feature set and/or a name-derived feature set), and bucket and/or cluster identifiers (the latter not being supplied until at least an initial clustering has been performed). Alternatively, during bucketizing, multiple tables 602 may be formed for the respective buckets (obviating the need for a bucket identifier in the individual author name mention data structures). Similarly, once clusters have been formed, a cluster table 604 may use a unique cluster identifier as the key, and include as attributes an array of author-name-mention identifiers or, alternatively, publication identifiers of the author name mentions or publications within the cluster (which may be updated once clusters are merged or split), the cluster label (i.e., an author name associated with the cluster as a whole), and the feature set associated with the cluster representative (which, as explained above, may be a selected one of the feature sets of the individual author name mentions falling within the cluster, or a combined or otherwise derived feature set) or a reference thereto. In various embodiments, the author name mention data structures are not persisted in storage, but created and used only temporarily during the clustering process, and deleted upon creation of publication clusters each corresponding to a disambiguated author.

A further table 606 may store compatibility and feature similarity data for pairs of author name mentions, pairs of clusters, and/or pairs of an author name mention and a cluster. Here, a duple including the identifiers of the respective author name mention(s) and/or cluster(s) may serve as the key. The attributes may include a binary parameter indicating whether the pair is name-compatible or not, as well as the levels and types of name specialization or data derived therefrom (such as the higher of the two levels of name specialization and the difference between the levels). Further, for each pair of author name mention(s) and/or cluster(s) that are name-compatible (and have the same type of name specialization in the case of author name mentions), a feature-similarity score computed for the pair may be stored as a further attribute; this field remains empty for incompatible pairs. Alternatively, the feature-similarity scores may be stored separately from the compatibility data in an additional table.

Using the compatibility and feature similarity table 606, the initial compatibility sets may be formed, e.g., by retrieving all entries for compatible pairs of author name mentions that share a given level and type of name specialization, and grouping these entries into sets of mutually compatible names. The grouping, in turn, may be accomplished, e.g., by using a selected one of the entries as the starting point of the first compatibility set and successively finding additional entries that overlap in one of their author name mentions with the initially selected entry. Once an entry has been sorted into an existing compatibility set, it may be marked as such, e.g., by storing the key of the entry that started the set as an attribute in the table. The entries that remain following completion of the first compatibility set may then be processed similarly to form the second compatibility set, and so forth. Alternatively to explicitly generating compatibility sets (even if only temporarily), the compatibility and feature similarity data of table 606 may be used to immediately form clusters within compatibility sets. For example, a selected pair of name-compatible publications whose feature similarity score exceeds a specified threshold may serve as the seed of a cluster, and all name-compatible pairs that share an author name mention with the seed (meaning that they fall within the same compatibility set) and likewise have a feature similarity score above the threshold may be assigned to the same cluster. An additional attribute within the compatibility and feature similarity table 606 may store the cluster ID, allowing entries already assigned to a cluster to be skipped thereafter.

It should be understood that the data schema of FIG. 6 is merely one example of structuring the data used to implement author-disambiguation methods in accordance herewith, and different data structures explicitly or implicitly corresponding to the conceptual entities described herein will occur to those of ordinary skill in the art.

Figure 7:
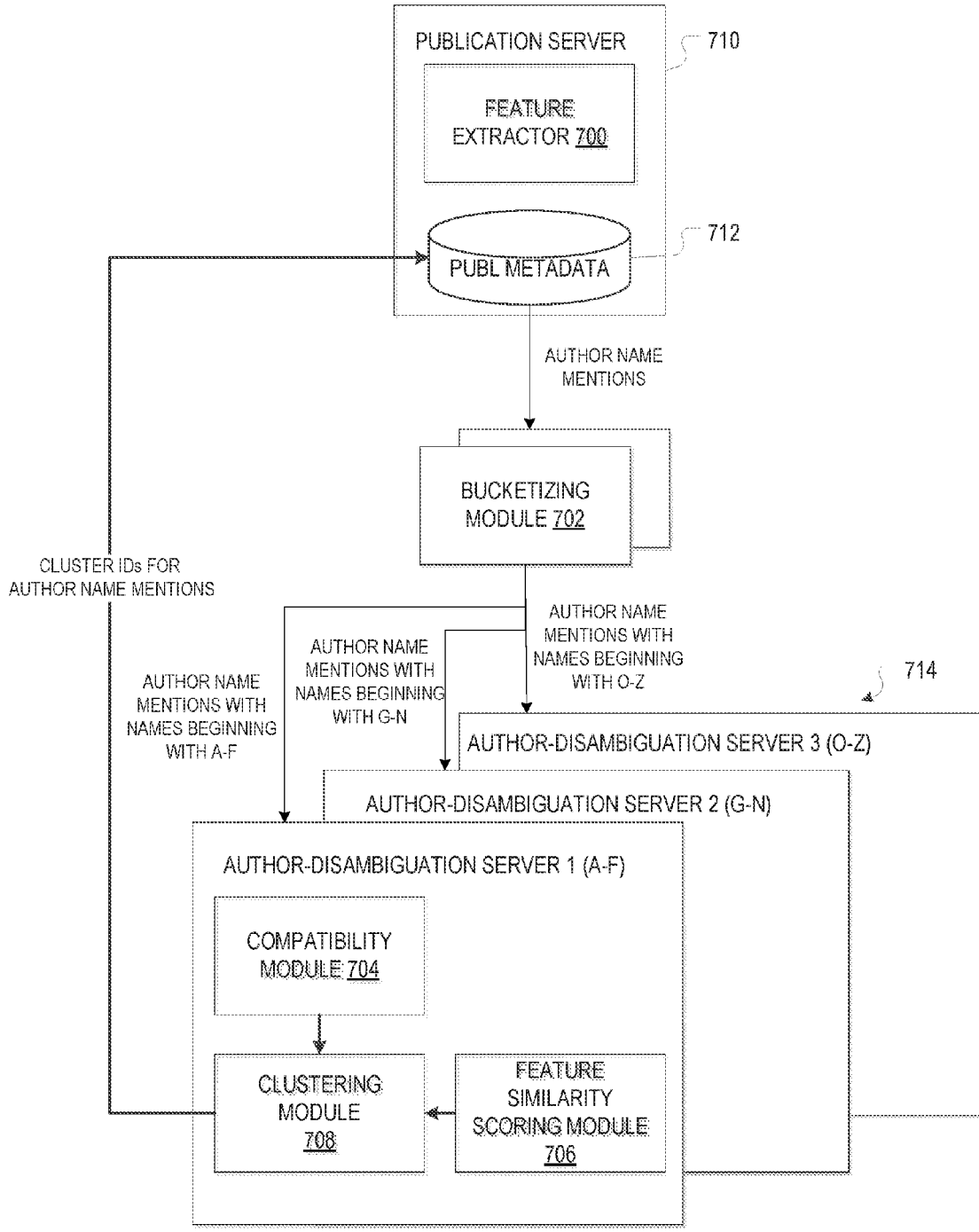
FIG. 7 is a block diagram of an example multi-server system for author disambiguation, illustrating the parallelizability of certain disambiguation operations in accordance with various embodiments.

FIG. 7 is a block diagram of an example multi-server system for author disambiguation, illustrating the parallelizability of certain disambiguation operations in accordance with various embodiments. The system includes multiple processing modules, e.g., implemented as software modules executed by one or more processors, that perform various tasks of the author disambiguation methods described herein. As shown, these modules may include a feature extractor 700 deriving feature sets from the stored publications, a bucketizing module 702 sorting author name mentions into buckets based on the author names, a compatibility module 704 assessing name compatibility between pairs of author name mentions and/or clusters and/or forming compatibility sets, a feature similarity module 706 computing similarity scores between pairs of author name mentions and/or clusters, and a clustering module 708 that uses the compatibility data and feature similarity scores to cluster author name mentions. As illustrated, the various modules may be replicated across multiple servers to enable parallel processing. In some embodiments, as shown, a publication server 710 stores the publication metadata in a database 712, and further hosts the feature extractor 700. One or more bucketizing modules 702 sort author name mentions (that is, pairs of a publication and a listed author name) based on the associated author names into multiple name buckets (e.g., as shown, three buckets for author name mentions having names beginning with the A-F, G-N, and O-Z, respectively); since the bucketizing process operates on individual publications, it is fully parallelizable. The author name mentions within the different buckets may be processed in parallel by multiple respective author-disambiguation servers 714, each including instances of the compatibility, feature similarity, and clustering modules 704, 706, 708. Of course, more than three author-disambiguation servers may be used. Further, certain operations within a bucket are parallelizable as well.

Cluster Assignment to Author Identities

While author-name-mention clusters as described above are formed such that each cluster represents a disambiguated cluster author in that it is with a high level of confidence associated with a single author, the clusters do not by themselves uniquely identify these authors. In fact, in order to avoid erroneously combining, in the same cluster, author name mentions that, in reality, belong to different individuals, author name mentions that do belong to the same individual are often split between multiple clusters. Accordingly, in various embodiments, clusters of author name mentions, once formed (e.g., with the method 200 explained with respect to FIG. 2, or in any other manner), are assigned to author identities, that is, to unique representations of individual authors. In a social-network and publication system 100, the individual authors are, for instance, uniquely represented by their respective user accounts. In other contexts, the author identities may be represented by uniquely identified entries of a master list of authors in an author and publication database.

Figure 8:
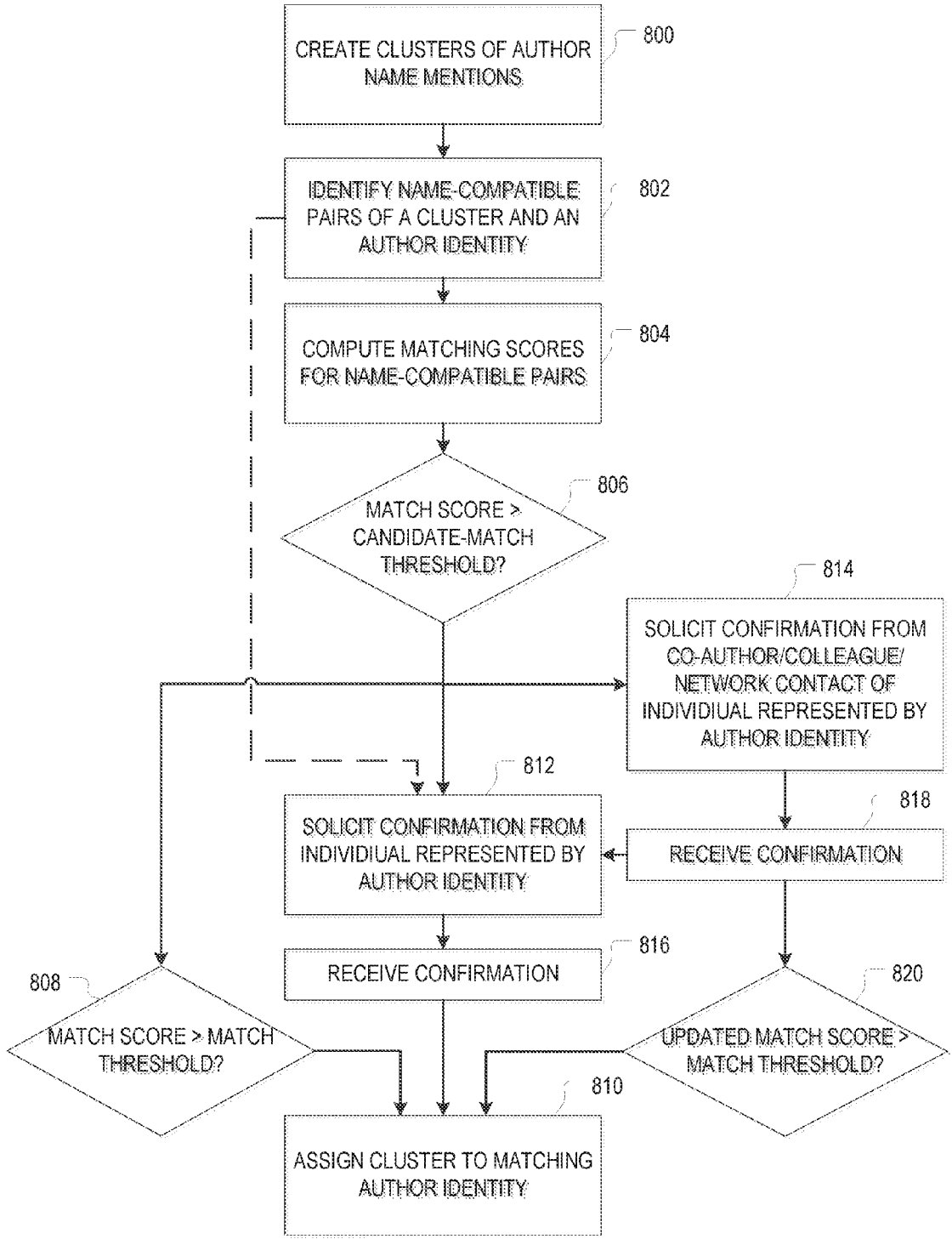
FIG. 8 is a flow diagram that illustrates an example method for assigning author-name-mention clusters to author identities, in accordance with various embodiments.

The assignment of author-name-mention clusters (and the publications contained therein) to author identities (and the individuals they represent) can be made automatically, based on user input, or using a combination of both (e.g., user input provided in response to an auto-generated suggestion). (In this context, any person that interfaces with a computing system for determining authorship can be deemed a "user," regardless of whether the system is a social-network and publication system as described with respect to FIG. 1 and of whether the user is a registered user of such a system. In addition to people that use the system in the role of customers, users also include, e.g., system administrators, curators, and the like.) FIG. 8 is a flow chart that provides an overview of various methods in accordance with some embodiments. The starting point in each case is the creation of author-name-mention clusters each representing a disambiguated cluster author (that can be mapped to only one unique author identity) (operation 800). Among the possibly large number of author identities and clusters, pairs of an author identity and a cluster whose associated author name, or label, is compatible with the name associated with the author identity (e.g., a user's name as stored in her user profile) are identified (operation 802). Name compatibility may be determined as explained above with respect to FIG. 3, allowing for variations of a name due to abbreviations as well as, in some embodiments, slight dissimilarities as may arise from spelling errors. Next, for name-compatible pairs of an author-name-mention cluster and an author identity, a match score is computed (operation 804), for example, by evaluating and combining various signals indicative of a match; examples of such signals are explained in more detail below with respect to FIGS. 9A-9F. In some embodiments, one or more of these signals are used to filter the pairs of an author-name-mention cluster and an author identity prior to computing the match scores, or even prior to restricting the pairs to those that are name-compatible. In accordance with various embodiments, the generation of author-name-mention data structures and their subsequent clustering, the identification of name-compatible pairs of clusters and author identities, and the computation of match scores are all performed automatically, that is, without direct human input.

If the computed match score for a pair exceeds a specified threshold (determined at 806), herein termed "candidate-match threshold," the pair is considered a candidate match and suggested to a human for confirmation. The candidate-match threshold may be specified as an absolute number. For example, if the match scores can range from zero (completely different) to one (perfect match), the candidate-match threshold may be set to 0.9. Alternatively, the candidate-match threshold may be a relative threshold. For example, if a user is to be presented with ten candidate matches, the pairs with the ten highest scores may be selected. In some embodiments or instances, the need for human input is obviated if the computed match score exceeds a specified second, higher threshold, herein termed "match threshold." For example, a match score above a match threshold of 0.98 may instill sufficient confidence in the automatic authorship determination. Accordingly, if the match threshold is exceeded (determined at 808), the author-name-mention cluster of the matching pair may be assigned to the associated author identity (operation 810).

In embodiments or situations where user input is requested, the confirmation of a candidate match may be solicited from the candidate author herself (i.e., the individual represented by the author identity associated with the candidate match) (operation 812) or by someone with potential knowledge of the candidate author and her publications (operation 814), such as a co-author (on other publications for which authorship has already been claimed), a colleague at the institution (e.g., the same university or company) and/or department, or a contact within the social network (e.g., a user who follows the candidate author on the website, who has communicated with the candidate author on the website, or who has established a direct connection within the network (e.g., via an invitation to connect and acceptance of the invitation)), herein all encompassed in the term "social contact." The request for confirmation may, for instance, take the form of an email, or be presented to the user on the social-network and publication website at certain time intervals (e.g., monthly) and/or in response to certain trigger events, such as logon of the user or an active request from the user to update his profile with new publications.

The user from whom input is requested is generally presented with at least a subset of the publications within the cluster and, unless the user is the candidate author herself, with some information about the candidate author (e.g., a link to the candidate author's user profile, or identifying information extracted therefrom), and asked to confirm that the candidate author indeed authored the publications within the subset. Presenting fewer than all publications associated with a given cluster generally makes sense for large clusters. For example, rather than presenting the user with tens of publications belonging to a certain cluster and asking her whether a certain identified social contact of hers is an author on all of them (which may be unduly burdensome and will likely go beyond the user's knowledge), the user may be shown only the three most-cited publications within the cluster and asked to confirm that her social contact authored these three publications. Nonetheless, once the candidate match is confirmed (based in full or in part on the user's input, as elaborated below), the cluster will be assigned in its entirety, that is, with all of its associated publications, to the candidate author.

In some embodiments, the user is presented, in conjunction with the (subset of) the publications within the cluster, with some attribute of the disambiguated cluster author (other than his name), e.g., as derived from the feature set(s) associated with the cluster. For example, the contact information, degree-granting institution, current place of employment, seniority or employment status, country of origin or residence, or other information about the cluster author may have been derived from the publications. When asking a user to confirm a candidate match between a cluster and an author identity, such cluster-author attributes may be used for further identification of the disambiguated cluster author. For instance, upon sign-up of a new user to the system and identification of a cluster whose label matches the new user's name, the user may be asked: "Are you the professor at Great University who authored the following four publications: . . . ?" Similarly, a user may be asked whether he co-authored a certain publication with "John Doe, disambiguation researcher at Name Mention University."

In accordance with various embodiments, receipt of the requested confirmation from the candidate author (at 816) is deemed dispositive, and results in assignment of the author-name-mention cluster (and all publications contained therein) to the candidate author identity (operation 880). Receipt of the confirmation from the candidate author's colleague, co-author, network contact, or otherwise connected individual (at 818) may be deemed dispositive as well, or may, as depicted, trigger a request for confirmation of the match by the candidate author (operation 812). For example, if a user repeatedly fails to respond to automatically generated requests for confirmation of his authorship on suggested candidate publications or clusters, the system may present the candidate matches to the user's co-authors or colleagues and, upon confirmation, re-send them to the user as a user-to-user suggestion; this may serve to exert peer pressure on the user to update his profile with the suggested clusters (if he is indeed the author). Alternatively, the confirmation from the connected user may be treated as yet another signal indicative of a match and used to update (generally increase) the match score, and if the updated match score exceeds a specified match threshold (which is generally set higher than the candidate-match threshold) (determined at 820), the cluster is assigned to the candidate author identity (operation 810) without requiring input from the candidate author. In some embodiments, solicitations for confirmation of a candidate match are sent to multiple of the candidate author's connections, and their confirmations (or rejections) are taken in combination to update the match score or to determine whether a request for confirmation is to be sent to the candidate author. The responses from the different users may be weighted based, for instance, on their track record in determining other users' authorship (e.g., giving higher weights to responses from users whose previous determinations were ultimately confirmed by the respective candidate authors) or based on their general reputation (e.g., as measured in terms of the impact factor of their publications or a reputation score computed within the social network).

In some embodiments, the computation of match scores between name-compatible pairs of an author-name-mention cluster and an author identity is circumvented, and the assignment of clusters to author identities is, instead, carried out simply based on human feedback. For example, as indicated in FIG. 8 with a dashed line, clusters that are name-compatible with a particular author identity (e.g., user account) may be directly shown to the individual that the author identity represents, and may be assigned to the author identity upon confirmation from that individual. Similarly, the name-compatible pairs may be presented to an individual other than the candidate author, such as a colleague or co-author, for confirmation. In either case, the collection of name-compatible clusters may, optionally, be filtered and/or ranked based on various match signals prior to presentation to the user.

The assignment of clusters to author identities (such as user accounts) may be effected in the computing system in various ways, e.g., by creating references or links between the author identities and the assigned clusters and/or associated publications (e.g., in the publication metadata stored for the publications, or in a separately stored authorship index), and may be used both internally and publicly. For example, in some embodiments, cluster assignments to authors result in automatic updates to user profiles of the respective authors, or proposals for such updates. Assigned publications may, for instance, be automatically added to a user's publication list (e.g., within a curriculum vitae), or analyzed to extract topics that can be added to the user's listed interests. In addition, search results (e.g., for publications by a specified author) and recommendations can be affected by cluster assignments.

Figure 9A:
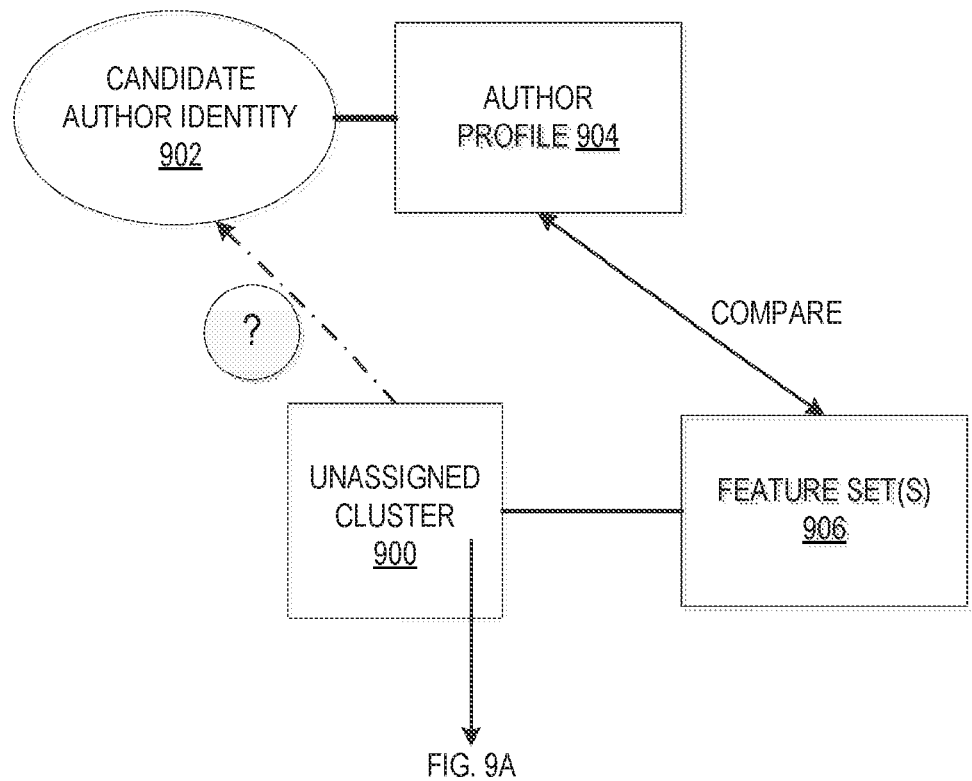
FIGS. 9A-9F are diagrams illustrating example signals indicative of a match between an author-name-mention cluster and a candidate author identity, in accordance with various embodiments.

FIGS. 9A-9F illustrate various approaches to comparing, and associated signals indicative of a match between, an (as of yet unassigned) author-name-mention cluster 900 and a candidate author identity 902. (A signal is "indicative" of a match if there is a positive correlation between the signal score (whose value range may be binary, discrete, or continuous) and the likelihood of a match. A signal need not be, and usually is not, dispositive of whether a candidate author truly corresponds to the disambiguated cluster author of the cluster at issue.) As shown in FIG. 9A, the author identity 902 has, in various embodiments, an author profile 904 specifying a number of features associated with it. For example, in an online social network and publication system 100 as contemplated herein, each user account may have an associated user profile (stored in user profile database 105 and specifying, e.g., the user's name, email address, affiliation, other contact information, research interests, publications, etc.) Similarly, as described above, the author-name-mention cluster 900 has one or more associated feature sets 906, which may be the above-described feature sets of the individual author name mentions within the cluster 900 (imputed to the cluster 900) or the feature set associated with a cluster representative or aggregated cluster representative. The feature set(s) 906 of the cluster 900 may include some of the same type of features as are stored in the author profile 904 of the author identity 902, facilitating comparisons between the features of the author profile 904 and those of the feature set(s) 906 of the cluster 900.

For example, both the author profile 904 and the feature set(s) 906 may specify the author's email address, and if the email addresses match, it is highly likely, given that email addresses are unique, that the cluster 900 belongs to the author identity 902. The email address in the author profile 904 may have been entered by the user when setting up his account, whereas the email address in the cluster feature set(s) 906 may have been extracted from the publications within the cluster 900, or derived based on other information extracted from the publication (e.g., constructed based on the author's name and institutional affiliation as obtained from the publication, in conjunction with a known pattern of email addresses of people affiliated with that institution). Since there may be some uncertainty associated with the email address specified in the cluster feature set(s) 906 (in particular if the email address was derived, rather than directly extracted from the publication(s)), even similarity (as opposed to an exact match) between the email addresses in the author profile 904 and the feature set(s) 906 may be a suitable signal indicating a likely match. Other features that, if similar between the cluster 900 and the author identity 902, may signal a match include the institutional affiliation (since the likelihood that two people with the same name work at the same institution is small), keywords (e.g., keywords in a user profile specifying research interests of the user as compared with topical keywords extracted from the publications), to name just a couple more examples.

Figure 9B:
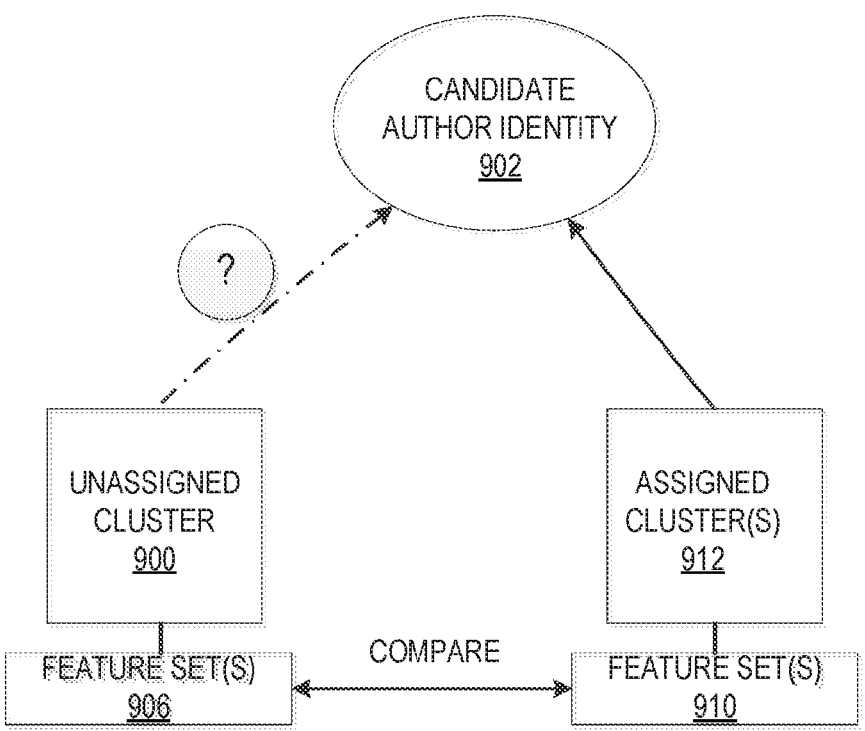
Figure 9C:
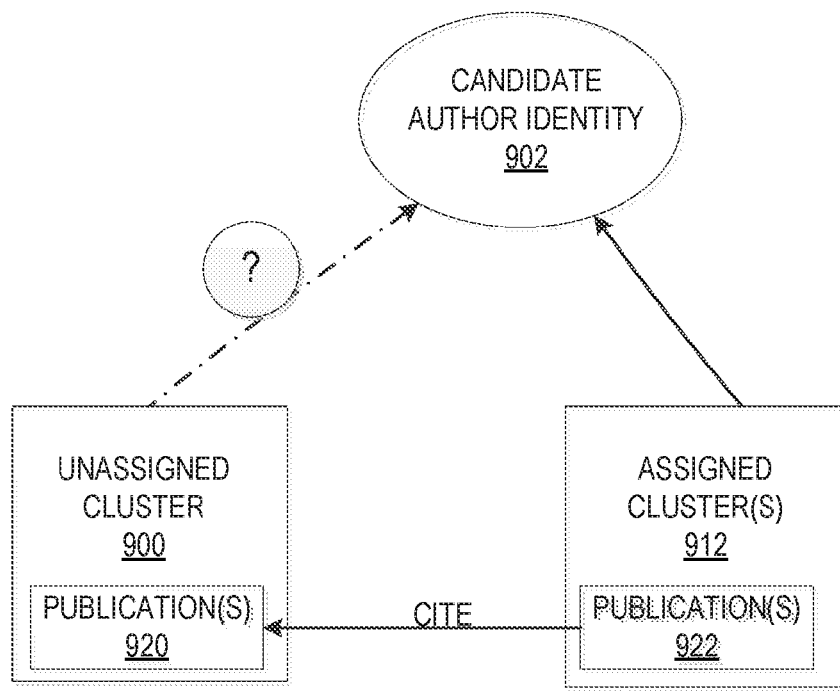

As illustrated in FIG. 9B, a match candidate may also be identified based on comparisons between the feature set(s) 906 of the unassigned author-name-mention cluster 900 at issue and the feature set(s) 910 of one or more author-name-mention clusters 912 already assigned to the candidate author identity 902. The feature-set comparisons may be made between individual author name mentions, between cluster representatives of the two clusters 900, 912, or between a cluster representative of one of the clusters 900, 912 and each of the individual author name mentions of the other cluster. The comparisons may be similar or identical to feature set comparisons carried out during the author-disambiguation process that results in creation of the author-name-mention clusters. However, since signals indicative of a match between a cluster and an author identity are used, in accordance with various embodiments, merely to identify candidate matches to be presented to a user for confirmation or rejection, the threshold feature similarity for a candidate match can be set lower than the threshold feature similarity for merging clusters or assigning author name mentions to the same cluster in the first place. (On the other hand, once two initially separate clusters have been assigned to the same author identity, they may be merged; in other words, assignment to the same author identity may be considered a dispositive factor for assignment to the same cluster. The originally formed individual clusters may be maintained as "sub-clusters," e.g., to group the publications of an author based on similarity.) In some embodiments, feature similarity between an unassigned cluster and clusters already assigned to the candidate author provide the primary signal used to compute match scores. Other signals (e.g., those explained with respect to FIGS. 9A and 9C-9F) may be used to filter down the number of name-compatible pairs of a cluster and an author identity in order to reduce the number of feature comparisons, which tend to be computationally expensive. In addition, these other features may be scored and combined with the feature-similarity score in an overall match score.

Authors have a tendency to cite their own prior publications. Accordingly, with reference to FIG. 9C, one or more citations to publications 920 within the unassigned cluster 900 that originate from publications 922 already assigned to the candidate author identity 902 (e.g., publications within one or more assigned clusters 912) may be taken as a signal indicative of a match. The signal may be quantified (i.e., a signal score may be computed) based on the number of such citations.

Figure 9D:
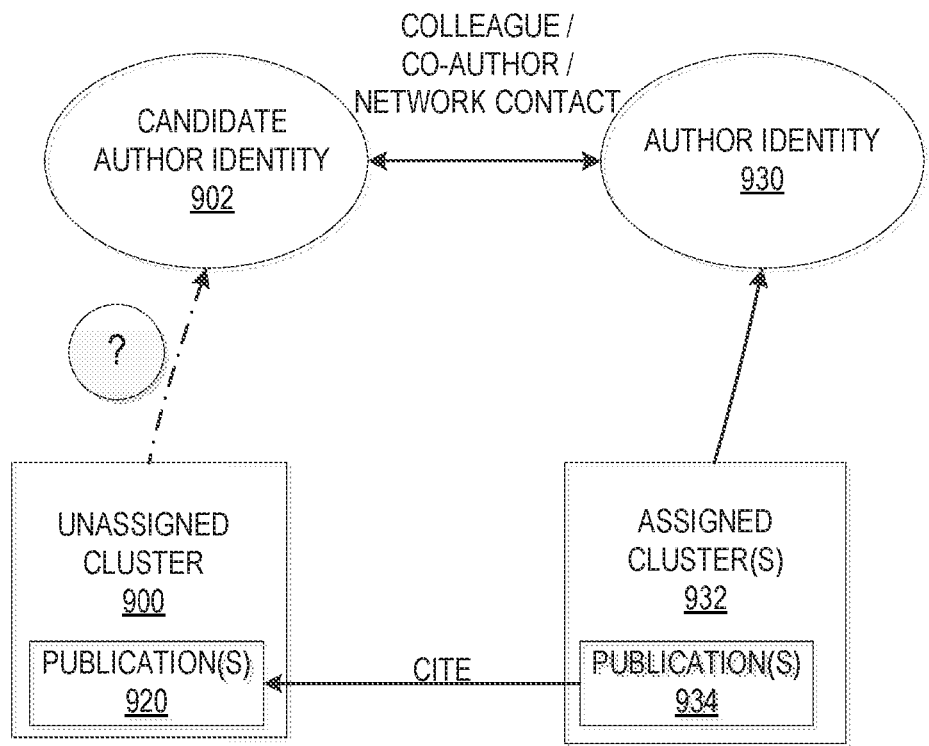
Figure 9E:
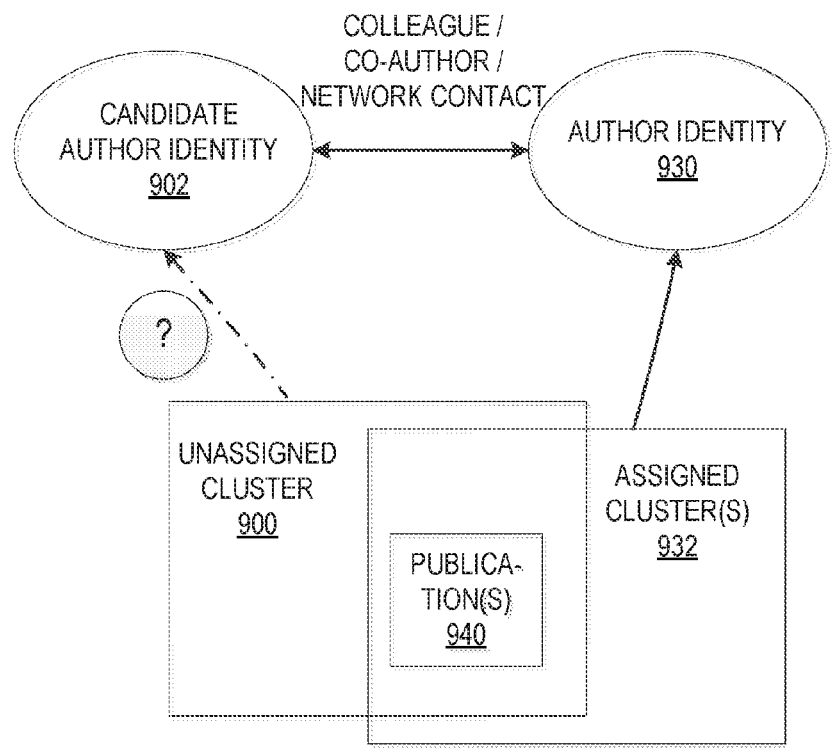
Figure 9F:
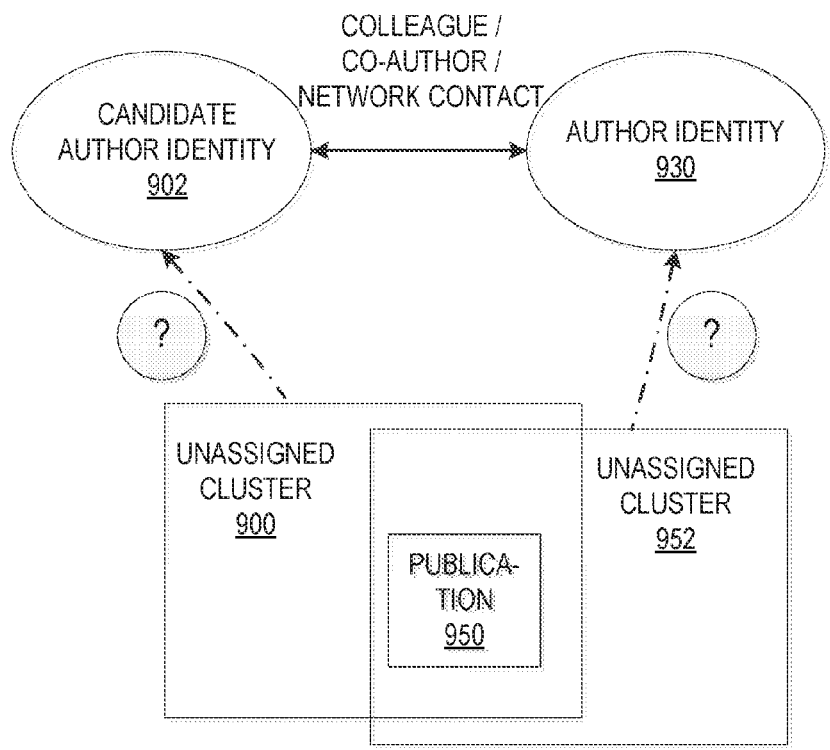

FIGS. 9D-9F illustrate signals that leverage information about the social connections between a candidate author and other people; such information is often available in a social network and publication system 100. As indicated, a connection between a candidate author (represented by candidate author identity 902) and another individual (represented by author identity 930) may be based on a variety of factors: two users may, for instance, be colleagues affiliated with the same institution or department, confirmed co-authors on publications that have been assigned to both users, or mutual network contacts by virtue of a direct link within the social network. Often, these types of connections are ascertainable directly from the user profiles, which may explicitly list affiliations, contacts, and publications of the users. One signal is based on the observation, similar to the tendency for self-citing underlying the signal of FIG. 9C, that people that are socially connected in some way tend to cite each other. Accordingly, one or more citations within publications 934 of the candidate author's contacts 930 to publications 920 within the unassigned cluster 900 are deemed, in accordance with some embodiments, indicators of a match. Again, the number of such citations (aggregated across multiple of the candidate author's connections) may be used to quantify the signal.

Authors furthermore tend to publish repeatedly with the same co-authors. Thus, with reference to FIG. 9E, if one or more publications 940 within the unassigned cluster 900 are also part of a cluster 932 assigned to a confirmed co-author (on other publications) of the candidate author, this may signal that the cluster 900 matches the candidate author identity 902. Similar reasoning may apply to publications co-authored by colleagues or network contacts of the candidate author, as colleagues (in particular within the same department) often publish together, and as people that publish together may also establish a connection in an online social network. As illustrated in FIG. 9F, co-authorship of a publication 950 may be used as an indicator of a match between the named authors listed on the publication and two respective mutually connected author identities 902, 930 even if the publication has been assigned to neither one of these author identities 902, 930, that is, if the author identities 902, 930 represent, at the time the signal is evaluated, merely candidate authors for respective unassigned clusters 900, 952. The underlying assumption is that co-authorship of a given publication is more likely between two people who are otherwise already connected (e.g., based on prior co-authorship of other publications). Thus, if the names of two co-authors on a given publication match the names of two connected people, this may serve as an indicator that these two people are, indeed, the authors of the publication.

Figure 10:
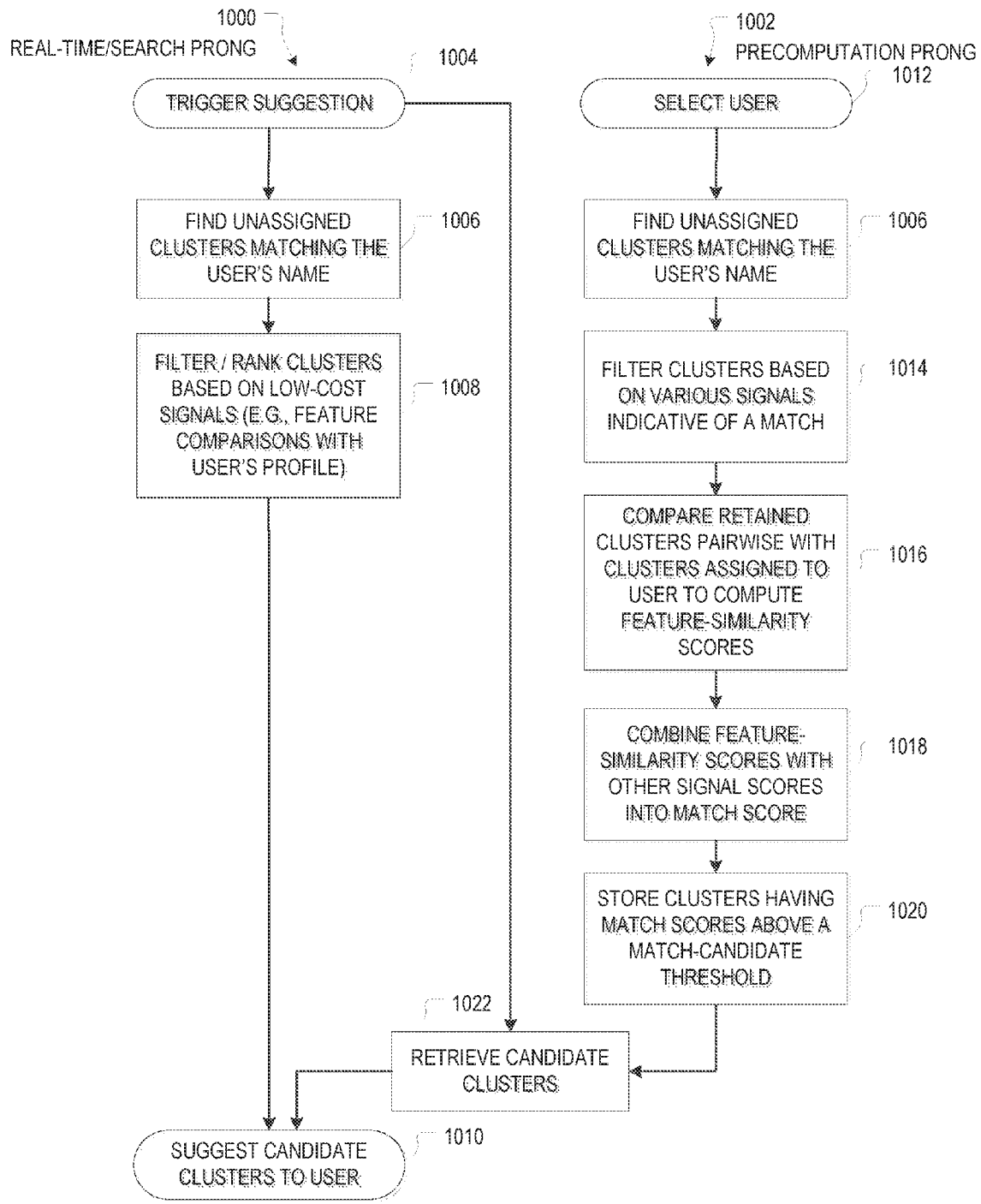
FIG. 10 is a flow diagram illustrating an example workflow for generating suggestions to a given author for publications he may have authored himself, in accordance with various embodiments.

The above and further signals may be used in various ways to generate suggestions to users for matching authors to publications, or to support automatic assignments of the publications (or the author-name-mention clusters that contain them) to matching author identities. FIG. 10 illustrates a workflow for generating suggestions to a given author for publications he may have authored himself. The depicted workflow includes two prongs: one for search-based suggestions generated in real-time (prong 1000) and one for pre-computed suggestions (prong 1002). The search-based prong 1000 is initiated by certain trigger events, such as, e.g., sign-up of a new user to a social-network and publication system 100 or an explicit request from a user for suggestions of publications that he may want to claim.

Upon triggering of the suggestion (at 1004), the search-based method begins with finding unassigned clusters that match the user's name (i.e., that are compatible with or similar to the user's name to a specified degree) (operation 1006). For a large publication corpus, the number of clusters received at this step may likewise be large, rendering it too burdensome or impractical to present all identified clusters to the user. Therefore, at operation 1008, the identified name-compatible unassigned clusters may be filtered and/or ranked based on signals that are computationally sufficiently low-cost to enable evaluation in real (or near-real) time. These low-cost signals may include, for example, feature comparisons (e.g., of email addresses, affiliations, etc.) between the user profile (stored, e.g., in a user-profile database 105) and the feature sets associated with the clusters (stored, e.g., in the author-name-mention database 132), as illustrated in FIG. 9A. Some other signals, such as self-citing (which may, in some embodiments, be discovered from feature comparisons between the author profile and the cluster feature sets), may likewise be feasible to consider, whereas signals that are based on the social connections of the user are usually too involved and, thus, reserved for pre-computation.

If one or more signals indicative of a match are found (e.g., the signals evaluate positive, or score high) for a certain cluster, they may serve to "boost" the cluster, i.e., shift it to a higher position within a ranked list. In some embodiments, ranking the clusters involves the computation of a ranking score that is at least similar to, if not the same as, the match score discussed above. Filtering the clusters may follow ranking, and be accomplished by retaining only a certain number of highest-ranking clusters (or only clusters with ranking or match scores exceeding a specified candidate-match threshold). Alternatively, filtering may be binary; for instance, a cluster may be retained based on a match between the author profile and the cluster feature set for any one of a list of features. The retained clusters constitute candidate clusters that are, in operation 1010, suggested to the user. In the user interface, the suggestion may take the form, not of clusters, but of individual publications, e.g., one or more representative publication for each candidate cluster. When the user claims a publication, however, the entire cluster to which the publication belongs may be assigned (avoiding the need for the user to claim each and every single publication, which could be a cumbersome process).

The pre-computation of clusters in prong 1002 may begin, for a given user selected at 1012, with the identification of unassigned clusters matching the user's name in the same manner as in the search-based prong 1000 (operation 1006). The selection of clusters, from the potentially large set of name-compatible clusters, that will be suggested to the user (i.e., the candidate author), however, may be based on a larger number of possible signals, including signals that are too time-consuming to evaluate to be used in real time (such as citations from or co-authorship with people with whom the user is connected in some way).

In various embodiments, the selection process takes place in multiple successive stages. At operation 1014, the number of name-compatible clusters is first filtered down based on various low-cost or medium-cost signals indicative of a match. The clusters that pass this stage are then compared, in terms of their associated feature sets, with clusters already assigned to the candidate author identity to compute a feature-similarity score for each pair of compared clusters (operation 1016); this computation is often computationally very expensive (and hence in accordance with some embodiments performed only for a sub-set of the name-compatible clusters). Optionally, the computed feature-similarity scores may be combined with scores computed for other signals (e.g., those used to filter the clusters prior to comparing feature sets) to arrive at an overall match score (operation 1018). For example, in some embodiments, each of the signals is scored within a range from zero to one to quantify a level at which the signal is present (e.g., a degree of similarity between email addresses, a normalized number of citations received from connections, etc.), and the individual signal scores are then combined into a weighted sum, where the weights depend on the relative strengths of the signals as indicators of a match and are optionally normalized to a sum of one to keep the match score within the range from zero to one. Alternatively, in some embodiments, the signals are cascaded according to their relative strength as indicators (beginning with the strongest signal), and are evaluated sequentially until a signal score that exceeds a candidate-match threshold is found. Once clusters with match scores exceeding the candidate-match threshold have been identified, they are stored in association with the author identity of the user for which they were evaluated (operation 1020). Subsequent retrieval of the stored candidate clusters (operation 1022) and presentation to the user (operation 1010) may be triggered (at 1004) in various ways, e.g., based on a user request or in accordance with a predetermined schedule.

Figure 11:
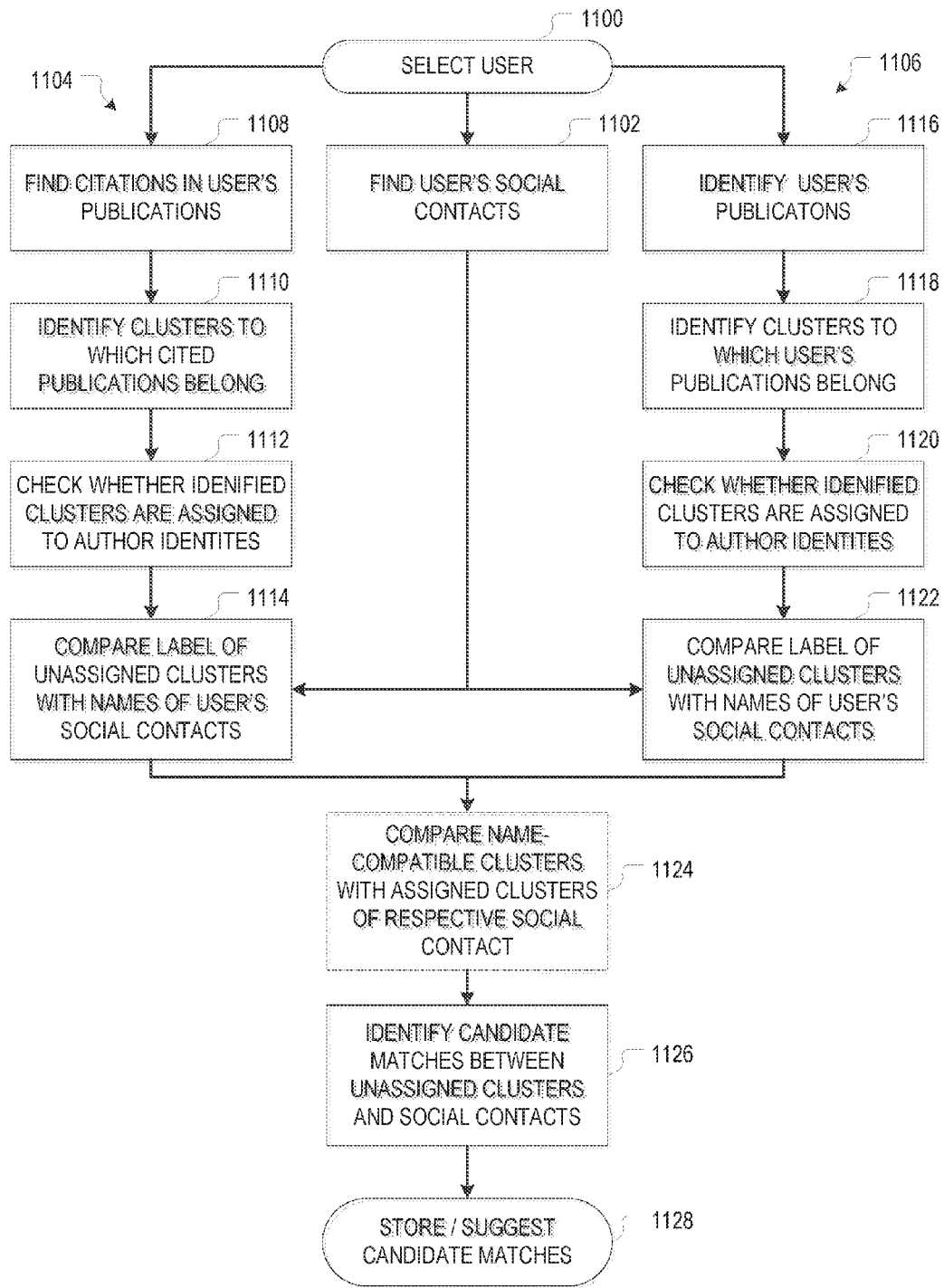
FIGS. 11 and 12 are flow diagrams illustrating example workflows for generating suggestions for indirect author assignments by an author's social contacts, in accordance with various embodiments.

FIG. 11 illustrates a workflow for generating suggestions for indirect author assignments, i.e., suggestions to a given user (e.g., the user acting as the suggester in a user-to-user suggestion) that reflect candidate matches between publications and other users (e.g., the users that receive the user-to-user suggestions). The workflow involves, following selection of a user (at 1100), finding the user's social contacts (operation 1102), such as institutional or department colleagues, co-authors, or social-network contacts. Colleagues can be determined by searching for users having the same affiliation as the selected user, using, for instance, affiliation information as stored in the user profile database 105. Co-authors can be identified by finding, for a selected user's publications, all author-name-mention clusters assigned to other people that contain one or more of these publications, as reflected, for example, in the author-name-mention database 132, or by looking up the co-authors in the publication metadata stored database 124; once co-authors for a selected user have been ascertained, they may be written to the user's profile or to a separate co-author index for subsequent retrieval. Social-network contacts can be defined in various ways, for instance, based on explicit contact requests sent between users via the social network and stored in the respective user profiles, or based on tracked interactions of users with other users' contents, which may be stored in the interaction database 128. Thus, a user may, for example, be deemed a social-network contact of all users whom he follows and/or all users that follow him.

Asking a user to confirm that another user has authored certain publications generally makes sense if the asked user not only knows that other user, but also has knowledge of the other user's authorship of the publications, e.g., by virtue of having co-authored or cited the publications. Accordingly, in parallel with identifying the selected user's social contacts (in operation 1102), the depicted workflow bifurcates into two prongs for identifying publications or clusters that these social contacts may have authored: a citation-based prong 1104 and a co-authorship-based prong 1106. The citation-based prong 1104 includes finding citations in the selected user's publications (operation 1108); identifying cluster to which the cited publications belong, e.g., by looking the publications up in the author-name-mention database 132 (operation 1110); and checking whether the identified clusters are assigned to author identities (operation 1112). The author names associates with any unassigned clusters (as reflected, e.g., in the cluster labels) are then compared with the names of the selected user's social contacts identified in operation 1102 (operation 1114) to find unassigned clusters, with publications cited by the selected user, that are name-compatible with the user's social contacts. Similarly, the co-authorship-based prong 1106 includes identifying the user's publications (operation 1116); identifying clusters to which those publications belong (operation 1118); checking whether the identified clusters are assigned to author identities (operation 1120); and comparing the names associated with any unassigned clusters with the names of the user's social contacts to find unassigned clusters, with publications co-authored by the selected user (operation 1122), that are name-compatible with the user's social contacts. Put differently, operations 1116-1120 serve to identify disambiguated cluster authors that represent co-authors of the user, but have not yet been linked to author identities (e.g., user accounts) of these co-authors, and in operation 1120, the user's social contacts are searched for people with the same or similar names as those disambiguated cluster authors.

Once name-compatible unassigned clusters that were cited and/or co-authored by the selected users have been found for one of the user's social contacts (as candidate author), they may optionally be compared with the assigned clusters of the social contact to determine the degree of feature similarity (operation 1124). In this manner, the number of name-compatible pairs of a cluster and an author identity can be filtered down. When candidate matches between the unassigned clusters and social contacts have been identified (operation 1126), they may be suggested to the selected user with a request for confirmation, and/or stored for later retrieval.

Figure 12:
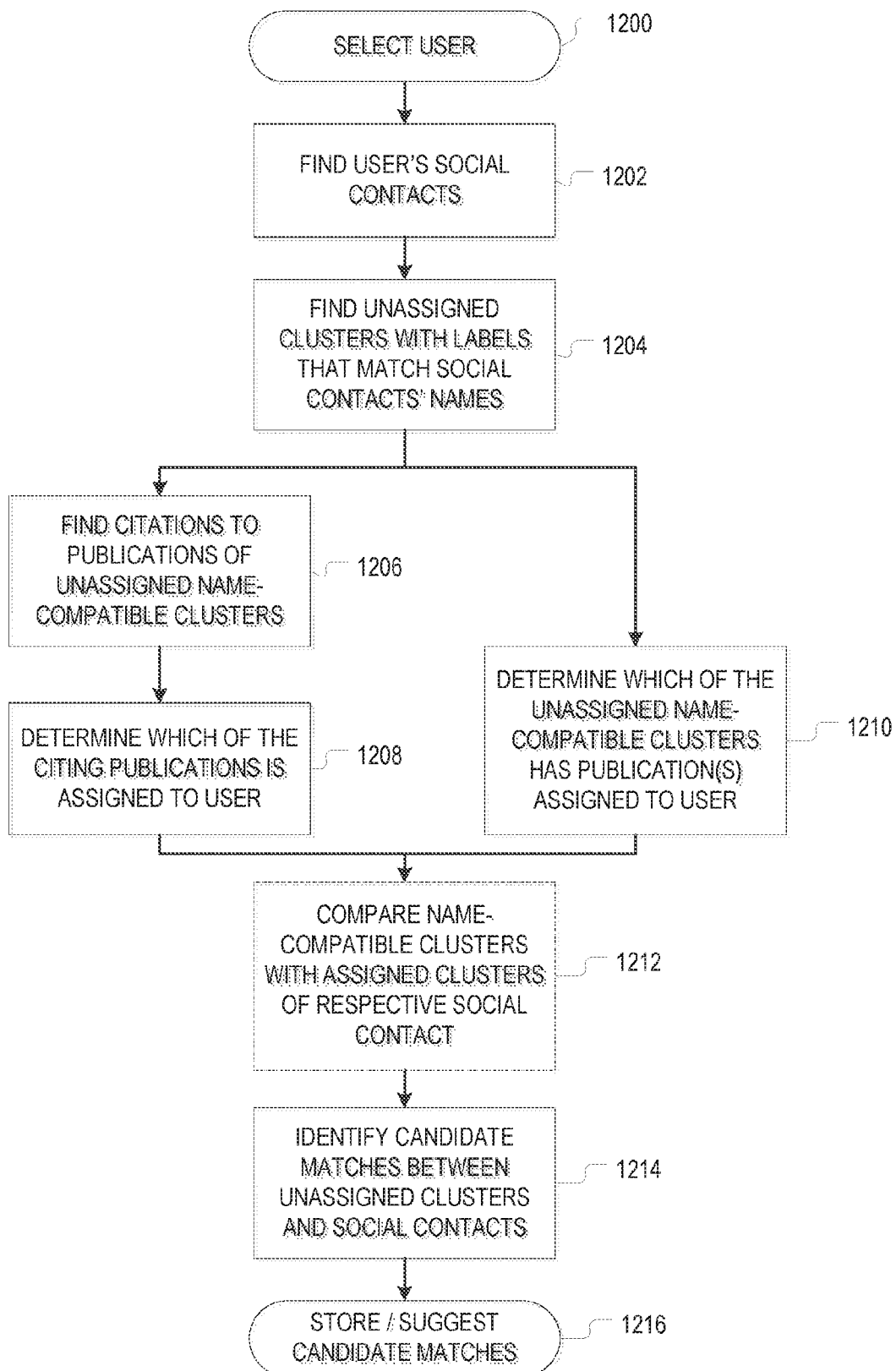

FIG. 12 illustrates an alternative workflow that serves the same purpose as that of FIG. 11: to identify match candidates between a user's social contacts (as candidate authors) and clusters containing publications that the user co-authored or cited. Here, following selection of a user (at 800), the user's social contacts are ascertained (operation 1202) and then unassigned clusters that are name-compatible with those contacts are identified (operation 1204), e.g., using the author-name-mention database 132. (Note that the number of clusters resulting from this process is generally larger than the numbers of clusters identified by the comparisons in operations 1114, 1122 of FIG. 11.) These name-compatible clusters are subsequently filtered down based on co-authorship or citation by the selected user. To filter based on citations, the publications within the identified unassigned clusters may be looked up in the citation index 126 to find all citing publications (operation 1206), and then it is determined which of the citing publications were authored by the user (e.g., belong to clusters assigned to the user) (operation 1208). To filter based on co-authorship, the publications within the identified unassigned clusters themselves are checked for assignment to the selected user (operation 1210). In both cases, the identified clusters may then be compared with clusters already assigned to the respective social contacts (operation 1212), and after identification of candidate matches between unassigned clusters and social contacts (1214), the candidate matches may be presented to the user or stored for later use (operation 1216).

As will be appreciated by those of ordinary skill in the art given the benefit of the present disclosure, whether cited or co-authored publications are first identified for the selected user in a forward-search and then checked for name-compatibility with the user's social contacts (as in FIG. 11), or whether clusters name-compatible with the user's social contacts are first identified and then checked for citations from or co-authorship by the user (as in FIG. 12), may be decided based on the ease and/or speed with which the utilized information can be ascertained or retrieved. It will furthermore be appreciated that the search for candidate matches between a cluster and an author identity based on social signals need not begin with the selection of a social contact. Rather, name-compatible pairs of a cluster and an author identity may first be identified, and for a given name-compatible pair, the social contacts of the individual represented by the author identity may be ascertained, followed by a determination whether that social contact has cited or co-authored any publications within the cluster, which would be taken as a social signal indicative of the match between the cluster and the name-compatible author identity.

The methods described herein may be implemented in a distributed computing environment, where tasks are divided and coordinated between multiple networked computers. Each computer may be, for instance, a suitably programmed general-purpose computer including one or more processors and associated memory, and typically one or more permanent computer-readable storage media (such as, e.g., hard disks) for storing data and/or instructions. An example machine architecture is described below with respect to FIG. 13, although not every component shown need be in each computer. The computers may communicate with each other via an intranet (e.g., implemented as a local-area network) or the Internet, using wired and/or wireless communication links.

In various embodiments, computationally expensive computing tasks are parallelized across multiple machines and/or multiple processors within a machine. For example, when carrying out the above-described method for author disambiguation, the different name buckets can be processed independently of one another and may, thus, be processed in parallel. Further, since there is no overlap in the author name mentions associated with different buckets, the data may be distributed across multiple machines, the author-name-mentions associated with each bucket being stored on the machine (or group of machines) where the respective bucket is being processed. Once compatibility sets have been formed within the buckets, the clustering within different compatibility sets may likewise be parallelized. However, since compatibility sets within a bucket may overlap in their author name mentions, data storage is generally either shared among compatibility sets within the bucket, or author name mentions that fall into multiple sets are replicated as necessary.

The computation of suggestions for author-name-mention clusters to be assigned to a given author identity also has potential for parallelization. For example, suggestions for different users can generally be computed in parallel. Alternatively, different computers may be configured to handle different discrete tasks. For instance, one group of computers may be assigned to the time-consuming task of comparing features sets associated with pairs of clusters, whereas other computers may be configured to identify unassigned clusters of interest and filter them based on various signals prior to having the feature sets compared, and yet other computers may serve to compute matching scores and identify match candidates. As the data (e.g., author-name-mention cluster data, citations, user profiles, etc.) accessed for various users and in the context of various tasks may overlap, various embodiments store the data centrally.

Modules, Components and Logic

Certain embodiments are described herein as including logic or a number of components, modules, or mechanisms. Modules may constitute either software modules (e.g., code embodied on a machine-readable medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below is set out a hardware (e.g., machine) architectures that may be deployed, in various embodiments.

Example Machine Architecture and Machine-Readable Medium

Figure 13:
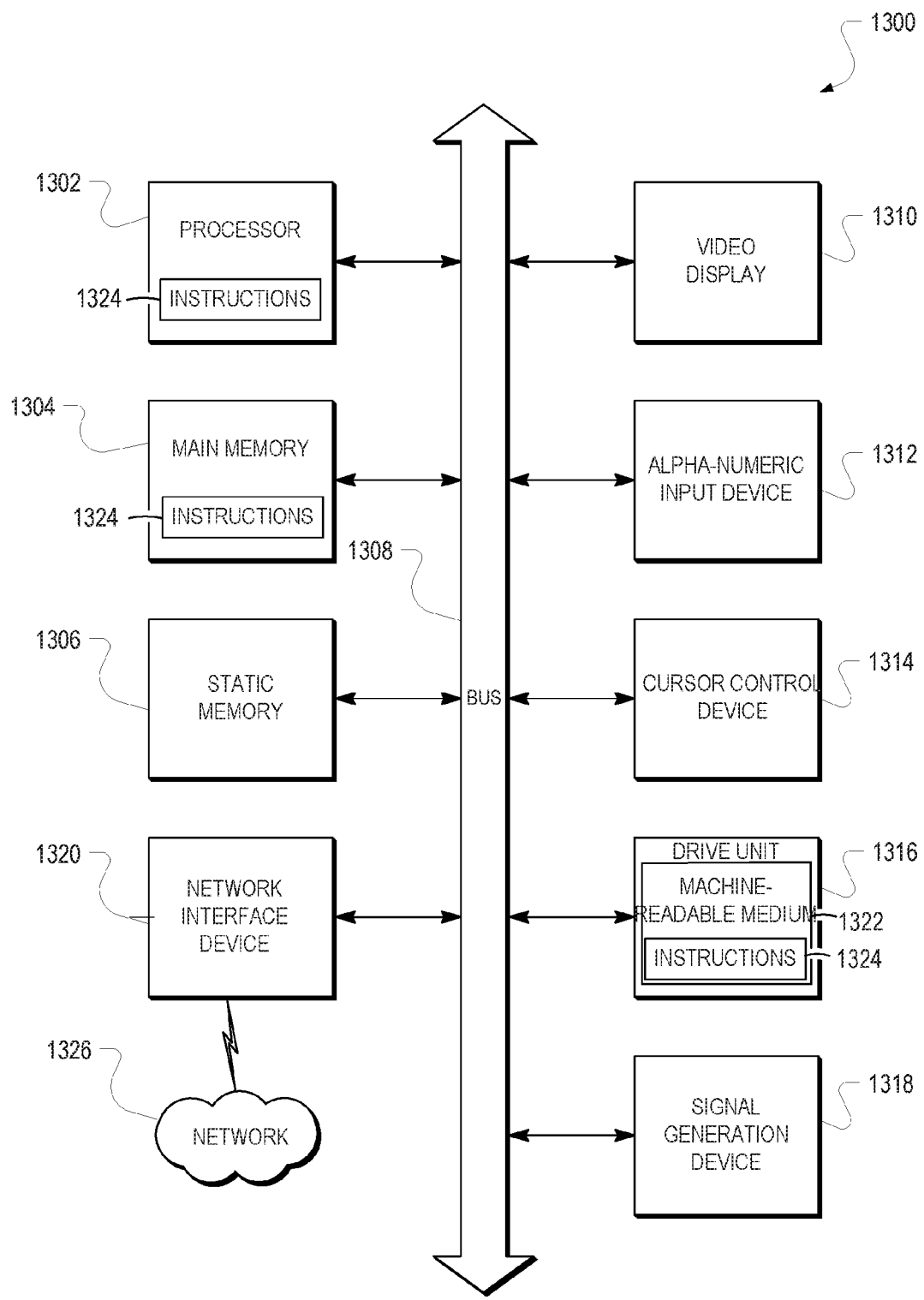
FIG. 13 is a block diagram of an example machine within which instructions for causing the machine to perform any one or more of the methodologies discussed herein may be executed.

The methods described herein may be implemented by software executing on a computer system comprising one or more machines. FIG. 13 is a block diagram of an example machine within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed)

network environment. The machine may be a personal computer (PC), a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1300 includes a processor 1302 (e.g., a central processing unit (CPU), a graphics processing unit (GPU) or both), a main memory 1304 and a static memory 1306, which communicate with each other via a bus 1308. The computer system 1300 may further include a video display unit 1310 (e.g., a liquid crystal display (LCD) or a cathode ray tube (CRT)). The computer system 1300 also includes an alphanumeric input device 1312 (e.g., a keyboard), a user interface (UI) navigation device 1314 (e.g., a mouse), a disk drive unit 1316, a signal generation device 1318 (e.g., a speaker) and a network interface device 1320.

The disk drive unit 1316 includes a machine-readable medium 1322 on which is stored one or more sets of instructions and data structures (e.g., software) 924 embodying or used by any one or more of the methodologies or functions described herein. The instructions 1324 may also reside, completely or at least partially, within the main memory 1304, static memory 1306, and/or within the processor 1302 during execution thereof by the computer system 1300, the main memory 1304 and the processor 1302 also constituting machine-readable media.

While the machine-readable medium 1322 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing or encoding data structures used by or associated with such instructions. The term "machine-readable medium" shall accordingly be taken to include, but not be limited to, solid-state memories, and optical and magnetic media. Specific examples of machine-readable media include non-volatile memory, including by way of example, semiconductor memory devices (e.g., Erasable Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks. All such machine-readable storage media are hardware devices suitable for storing data and/or instructions for a suitable period of time to enable use by the machine, and are therefore non-transitory. The instructions 1324 may further be transmitted or received over a communications network 1326 using a transmission medium. The instructions 1324 may be transmitted using the network interface device 1320 and any one of a number of well-known transfer protocols (e.g., HTTP). Examples of communication networks include a LAN, a WAN, the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

The following numbered examples are illustrative embodiments.

1. A method, comprising: for a plurality of author identities and a plurality of clusters of author-name mentions, each author-name mention identifying a pair of a publication and a name of an author of the publication and each author-name-mention cluster being assignable to only a single author identity, (i) automatically identifying candidate matches between author-name-mention clusters and author identities based at least in part on similarity between author names associated with the author-name-mention clusters and the author identities; and (ii) for at least one of the identified candidate matches, assigning, in a database, the author-name-mention cluster to the respective author identity.

2. The method of example 1, wherein the author identities are user accounts.

3. The method of example 1 or example 2, further comprising: generating the plurality of author-name-mention clusters based at least in part on comparisons between the author names and at least partially publication-derived feature sets associated with the author-name mentions.

4. The method of example 3, wherein generating the plurality of author-name-mention clusters comprises grouping the author-name mentions into sets of compatible author names, and generating the clusters within the sets of compatible author names based on a calculated pairwise similarity between the feature sets.

5. The method of example 4, wherein generating the plurality of author-name-mention clusters further comprises sorting the author-name mentions into disjunct name buckets, and performing the grouping into the sets of compatible author names separately for each name bucket.

6. The method of any of the preceding examples, wherein automatically identifying candidate matches between author-name-mention clusters and author identities comprises computing a match score for each of a plurality of pairs of an author-name-mention cluster and an author identity having compatible associated author names, the candidate matches being pairs whose match score exceeds a specified absolute or relative candidate-match threshold.

7. The method of example 6, wherein computing the match scores for the plurality of pairs of an author-name-mention cluster and an author identity comprises evaluating one or more signals indicative of a match for each of the plurality of pairs.

8. The method of example 7, wherein computing the match scores further comprises computing a weighted combination of the one or more evaluated signals.

9. The method of example 7, wherein evaluating one or more signals comprises, for each pair, sequentially evaluating a plurality of signals according to a signal cascade until the pair is identified as a candidate match or all available signals have been evaluated.

10. The method of any of examples 7-9, wherein the signals comprise at least one of: feature similarity between the author-name-mention cluster and other author-name mention clusters assigned to the author identity; similarity between email addresses associated with the author-name-mention cluster and the author identity; rarity of the author names of the author-name-mention cluster and the author identity; a citation to a publication within the author-name-mention cluster by another publication assigned to the author identity; a citation to a publication within the author-name-mention cluster by a publication assigned to another author identity representing an individual that is at least one of a social-network contact, institutional colleague, or confirmed co-author of the author identity; or assignment of a publication within the author-name-mention cluster to another author identity as co-author, the other author identity representing an individual that is at least one of a social-network contact, institutional colleague, or confirmed co-author of the author identity.

11. The method of any of examples 6-10, wherein the assignment of the author-name-mention cluster to the respective author identity is performed automatically for candidate matches having a match score above a specified match threshold equal to or greater than the candidate-match threshold.

12. The method of any of examples 1-10, further comprising: for at least some of the identified candidate matches between an author-name-mention cluster and an author identity, soliciting confirmation from one or more users that the author identity represents an individual who authored the publications within the author-name-mention cluster; and receiving the solicited confirmation for one or more of the candidate matches, wherein the assignment of author-name-mention clusters to author identities is performed only for the one or more of the candidate matches for which the confirmation is received.

13. The method of example 12, wherein the one or more users from whom the confirmation is solicited comprise at least one of an individual represented by the author identity; a co-author, a colleague with common institutional and/or departmental affiliation, or a social-network contact of the individual represented by the author identity; or an administrator of a system performing the automatic identification of the pairs of an author-name-mention cluster and an author identity.

14. The method of example 12 or example 13, wherein the confirmation is solicited via at least one of an email or a prompt for user input on a website.

15. The method of any of examples 12-14, wherein automatically identifying the candidate matches between an author-name-mention cluster and an author identity and soliciting confirmation comprises, during sign-up of a user to an online social-network and publication system, identifying one or more author-name-mention clusters that match the user's author identity, and soliciting confirmation from the user that the user authored the publications within the one or more clusters.

16. The method of example 15, wherein identifying the author-name-mention clusters for the user comprises searching the plurality of author-name-mention clusters based on the user's name.

17. The method of example 16, wherein identifying the author-name-mention clusters for the user further comprises, among the clusters identified by the search, boosting clusters based on at least one of recency of publications within the clusters or overlap of features associated with the clusters with a country, institution, discipline, or keywords associated with the user.

18. The method of any of examples 12-14, wherein soliciting confirmation from one or more users comprises soliciting confirmation from a user other than the user represented by the author identity.

19. The method of example 18, wherein soliciting confirmation from one or more users further comprises, in response to receipt of the solicited confirmation from the at least one other user, causing confirmation to be solicited from the user represented by the author identity.

20. The method of example 18, wherein the author-name-mention cluster is assigned to the author identity in response to the confirmation from the at least one other user without further human input.

21. The method of example 20, further comprising informing the user represented by the author identity of the assignment, and reversing the assignment in response to an objection from the user.

Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This description, therefore, is not to be taken in a limiting sense, and the scope of various embodiments is defined only by the appended claims, along with the full range of equivalents to which such claims are entitled.

What is claimed is:

1. A method, executed by a computing system, for assigning publications to authors, the method comprising:
   for each of a plurality of publications, generating an author-name-mention data structure for each author name listed on the publication, the author-name-mention data structure comprising at least an identifier of the publication and the listed author name;
   associating, with each of the author-name-mention data structures, a feature set derived from the publication identified in the author-name-mention data structure;
   automatically clustering the author-name-mention data structures, at least in part based on comparison between the feature sets, to form a plurality of clusters each representing a disambiguated cluster author and containing one or more publications within the cluster;
   for a selected individual, searching one or more databases to identify social contacts of the selected individual;
   searching the one or more databases to automatically identify, among unassigned ones of the plurality of clusters and a plurality of author identities uniquely representing the selected individual's social contacts within the computing system, pairs of a cluster and an author identity name-compatible with the disambiguated cluster author of the cluster; and
   searching the one or more databases to detect, for at least one of the pairs of a cluster and a name-compatible author identity, at least one publication within the cluster that is at least one of co-authored by the selected individual or cited in a publication authored or co-authored by the selected individual,
   suggesting the at least one pair of a cluster and a name-compatible author identity representing one of the selected individual's social contacts as a candidate match to the selected individual with a request for confirmation that the social contact represented by the author identity is the disambiguated cluster author of the cluster, and, following receipt of the requested confirmation, assigning the cluster to the name-compatible author identity based at least in part on the confirmation.

2. The method of claim 1, wherein the social contact represented by the author identity of the pair is at least one of a colleague, confirmed co-author, or network contact of the selected individual.

3. The method of claim 1, further comprising, following the detecting, comparing a feature set associated with the cluster to one or more features sets of one or more other clusters previously assigned to the name-compatible author identity to compute one or more respective feature-similarity scores, wherein the cluster is assigned to the name-compatible author identity further based at least in part on the one or more feature-similarity scores.

4. The method of claim 1, wherein the selected individual is a confirmed co-author of the at least one publication within the cluster.

5. The method of claim 1, wherein the selected individual is a candidate author of the at least one publication within the cluster.

6. A method, executed by a computing system, for assigning publications to authors, the method comprising:
   for each of a plurality of publications, generating an author-name-mention data structure for each author name listed on the publication, the author-name-mention data structure comprising at least an identifier of the publication and the listed author name;
   associating, with each of the author-name-mention data structures, a feature set derived from the publication identified in the author-name-mention data structure;
   automatically clustering the author-name-mention data structures, based at least in part on comparisons between the associated feature sets, to form a plurality of clusters each representing a disambiguated cluster author and containing one or more publications within the cluster;
   searching one or more databases to automatically identify, among the plurality of clusters and a plurality of author identities uniquely representing individuals within the computing system, pairs of a cluster and an author identity name-compatible with the disambiguated cluster author of the cluster; and
   following the identification of at least one of the pairs of a cluster and a name-compatible author identity,
      searching the one or more databases to identify one or more social contacts of the individual represented by the author identity,
      searching, within the one or more databases, publications authored or co-authored by the identified social contacts for at least one of publications within the cluster or publications citing to publications within the cluster to detect at least one publication within the cluster that is at least one of co-authored by one of the one or more social contacts or cited in a publication authored or co-authored by one of the one or more social contacts,
      suggesting the pair as a candidate match to the one of the one or more social contacts with a request for confirmation that the individual represented by the author identity is the disambiguated cluster author of the cluster, and, following receipt of the requested confirmation, assigning the cluster to the name-compatible author identity based at least in part on the confirmation.

7. A method, executed by a computing system, for assigning publications to authors, the method comprising:
   for each of a plurality of publications, generating an author-name-mention data structure for each author name listed on the publication, the author-name-mention data structure comprising at least an identifier of the publication and the listed author name;
   associating, with each of the author-name-mention data structures, a feature set derived from the publication identified in the author-name-mention data structure;
   automatically clustering the author-name-mention data structures, based at least in part on comparisons between the associated feature sets, to form a plurality of clusters each representing a disambiguated cluster author and containing one or more publications within the cluster;
   for a selected individual, searching one or more databases to identify social contacts of the selected individual and publications co-authored or cited by the selected individual;
   searching the one or more databases to identify one or more clusters, among the plurality of clusters each representing a disambiguated cluster author, that contain one or more of the identified publications co-authored or cited by the selected individual and that are unassigned; and
   comparing names of the one or more disambiguated cluster authors of the one or more identified unassigned clusters with names of the selected individual's identified social contacts to automatically identify, among the unassigned clusters and author identities uniquely representing the identified social contacts within the computing system, one or more name-compatible pairs of a cluster and an author identity;
   suggesting at least one of the one or more identified pairs as a candidate match to the selected individual with a request for confirmation that the social contact represented by the respective author identity is the disambiguated cluster author of the respective cluster, and, following receipt of the requested confirmation from the selected individual, assigning the cluster to the respective name-compatible author identity based at least in part on the confirmation.

8. A tangible machine-readable medium storing instructions which, when executed by one or more processors of a machine, cause the machine to perform operations comprising:
   for each of a plurality of publications, generating an author-name-mention data structure for each author name listed on the publication, the author-name-mention data structure comprising at least an identifier of the publication and the listed author name;
   associating, with each of the author-name-mention data structures, a feature set derived from the publication identified in the author-name-mention data structure;
   automatically clustering the author-name-mention data structures, at least in part based on comparison between the feature sets, to form a plurality of clusters each representing a disambiguated cluster author and containing one or more publications within the cluster;
   for a selected individual, searching one or more databases to identify social contacts of the selected individual;
   searching the one or more databases to automatically identify, among unassigned ones of the plurality of clusters and a plurality of author identities uniquely representing the selected individual's social contacts within the computing system, pairs of a cluster and an author identity name-compatible with the disambiguated cluster author of the cluster; and searching the one or more databases to detect, for at least one of the pairs of a cluster and a name-compatible author identity, at least one publication within the cluster that is at least one of co-authored by the selected individual or cited in a publication authored or co-authored by the selected individual, suggesting the at least one pair of a cluster and a name-compatible author identity representing one of the selected individual's social contacts as a candidate match to the selected individual with a request for confirmation that the social contact represented by the author identity is the disambiguated cluster author of the cluster and, following receipt of the requested confirmation, assigning the cluster to the name-compatible author identity based at least in part on the confirmation.

9. The machine-readable medium of claim 8, wherein the social contact represented by the author identity of the pair is at least one of a colleague, confirmed co-author, or network contact of the selected individual.

10. The machine-readable medium of claim 8, wherein the operations further comprise, following the detecting, comparing a feature set associated with the cluster to one or more features sets of one or more other clusters previously assigned to the name-compatible author identity to compute one or more respective feature-similarity scores, wherein the cluster is assigned to the name-compatible author identity further based at least in part on the one or more feature-similarity scores.

11. The machine-readable medium of claim 8, wherein the selected individual is a confirmed co-author of the at least one publication within the cluster.

12. The machine-readable medium of claim 8, wherein the selected individual is a candidate author of the at least one publication within the cluster.

13. A tangible machine-readable medium storing instructions which, when executed by one or more processors of a machine, cause the machine to perform operations comprising:

for each of a plurality of publications, generating an author-name-mention data structure for each author name listed on the publication, the author-name-mention data structure comprising at least an identifier of the publication and the listed author name;

associating, with each of the author-name-mention data structures, a feature set derived from the publication identified in the author-name-mention data structure;

automatically clustering the author-name-mention data structures, based at least in part on comparisons between the associated feature sets, to form a plurality of clusters each representing a disambiguated cluster author and containing one or more publications within the cluster;

searching one or more databases to automatically identify, among the plurality of clusters and a plurality of author identities uniquely representing individuals within the computing system, pairs of a cluster and an author identity name-compatible with the disambiguated cluster author of the cluster; and following the identification of at least one of the pairs of a cluster and a name-compatible author identity, searching the one or more databases to identify one or more social contacts of the individual represented by the author identity, searching, within the one or more databases, publications authored or co-authored by the identified social contacts for at least one of publications within the cluster of publications citing to publications within the cluster to detect at least one publication within the cluster that is at least one of co-authored by one of the one or more social contacts or cited in a publication authored or co-authored by on of the one or more social contacts, suggesting the pair as a candidate match to the one of the one or more social contacts with a request for confirmation that the individual represented by the author identity is the disambiguated cluster author of the cluster, and, following receipt of the requested confirmation, assigning the cluster to the name-compatible author identity based at least in part on the confirmation.

14. A tangible machine-readable medium storing instructions which, when executed by one or more processors of a machine, cause the machine to perform operations comprising:

for each of a plurality of publications, generating an author-name-mention data structure for each author name listed on the publication, the author-name-mention data structure comprising at least an identifier of the publication and the listed author name;

associating, with each of the author-name-mention data structures, a feature set derived from the publication identified in the author-name-mention data structure;

automatically clustering the author-name-mention data structures, based at least in part on comparisons between the associated feature sets, to form a plurality of clusters each representing a disambiguated cluster author and containing one or more publications within the cluster;

for a selected individual, searching one or more databases to identify social contacts of the selected individual and publications co-authored or cited by the selected individual;

searching the one or more databases to identify one or more clusters, among the plurality of clusters each representing a disambiguated cluster author, that contain one or more of the identified publications co-authored or cited by the selected individual and that are unassigned; and comparing names of the one or more disambiguated cluster authors of the one or more identified unassigned clusters with names of the selected individual's identified social contacts to automatically identify, among the unassigned clusters and author identities uniquely representing the identified social contacts within the computing system, one or more name-compatible pairs of a cluster and an author identity;

suggesting at least one of the one or more identified pairs as a candidate match to the selected individual with a request for confirmation that the social contact represented by the respective author identity is the disambiguated cluster author of the respective cluster, and, following receipt of the requested confirmation from the selected individual, assigning the cluster to the respective name-compatible author identity based at least in part on the confirmation.

15. A computing system for assigning publications to authors, the system comprising:

one or more processors; and a memory comprising instructions which, when executed by the one or more processors, cause the one or more processors to perform operations comprising:

for each of a plurality of publications, generating an author-name-mention data structure for each author name listed on the publication, the author-name-mention data structure comprising at least an identifier of the publication and the listed author name;

associating, with each of the author-name-mention data structures, a feature set derived from the publication identified in the author-name-mention data structure;

automatically clustering the author-name-mention data structures, at least in part based on comparison between the feature sets, to form a plurality of clusters each representing a disambiguated cluster author and containing one or more publications within the cluster;

for a selected individual, searching one or more databases to identify social contacts of the selected individual;

searching the one or more databases to automatically identify, among unassigned ones of the plurality of clusters and a plurality of author identities uniquely representing the selected individual's social contacts within the computing system, pairs of a cluster and an author identity name-compatible with the disambiguated cluster author of the cluster; and searching the one or more databases to detect, for at least one of the pairs of a cluster and a name-compatible author identity, at least one publication within the cluster that is at least one of co-authored by the selected individual or cited in a publication authored or co-authored by the selected individual, suggesting the at least one pair of a cluster and a name-compatible author identity representing one of the selected individual's social contacts as a candidate match to the selected individual with a request for confirmation that the social contact represented by the author identity is the disambiguated cluster author of the cluster, and, following receipt of the requested confirmation, assigning the cluster to the name-compatible author identity based at least in part on the confirmation.

16. The system of claim 15, wherein the operations further comprise, following the detecting, comparing a feature set associated with the cluster to one or more features sets of one or more other clusters previously assigned to the name-compatible author identity to compute one or more respective feature-similarity scores, wherein the cluster is assigned to the name-compatible author identity further based at least in part on the one or more feature-similarity scores.

17. A computing system for assigning publications to authors, the system comprising:
one or more processors; and
a memory comprising instructions which, when executed by the one or more processors, cause the one or more processors to perform operations comprising:
for each of a plurality of publications, generating an author-name-mention data structure for each author name listed on the publication, the author-name-mention data structure comprising at least an identifier of the publication and the listed author name;
associating, with each of the author-name-mention data structures, a feature set derived from the publication identified in the author-name-mention data structure;
automatically clustering the author-name-mention data structures, based at least in part on comparisons between the associated feature sets, to form a plurality of clusters each representing a disambiguated cluster author and containing one or more publications within the cluster;

searching one or more databases to automatically identify, among the plurality of clusters and a plurality of author identities uniquely representing individuals within the computing system, pairs of a cluster and an author identity name-compatible with the disambiguated cluster author of the cluster; and following the identification of at least one of the pairs of a cluster and a name-compatible author identity,
searching the one or more databases to identify one or more social contacts of the individual represented by the author identity,
searching, within the one or more databases, publications authored or co-authored by the identified social contacts for at least one of publications within the cluster or publications citing to publications within the cluster to detect at least one publication within the cluster that is at least one of co-authored by one of the one or more social contacts or cited in a publication authored or co-authored by one of the one or more social contacts,
suggesting the pair as a candidate match to the one of the one or more social contacts with a request for confirmation that the individual represented by the author identity is the disambiguated cluster author of the cluster, and, following receipt of the requested confirmation, assigning the cluster to the name-compatible author identity based at least in part on the confirmation.

18. A computing system for assigning publications to authors, the system comprising:
one or more processors; and
a memory comprising instructions which, when executed by the one or more processors, cause the one or more processors to perform operations comprising:
for each of a plurality of publications, generating an author-name-mention data structure for each author name listed on the publication, the author-name-mention data structure comprising at least an identifier of the publication and the listed author name;
associating, with each of the author-name-mention data structures, a feature set derived from the publication identified in the author-name-mention data structure;
automatically clustering the author-name-mention data structures, based at least in part on comparisons between the associated feature sets, to form a plurality of clusters each representing a disambiguated cluster author and containing one or more publications within the cluster;
for a selected individual, searching one or more databases to identify social contacts of the selected individual and publications co-authored or cited by the selected individual;
searching the one or more databases to identify one or more clusters, among the plurality of clusters each representing a disambiguated cluster author, that contain one or more of the identified publications co-authored or cited by the selected individual and that are unassigned; and
comparing names of the one or more disambiguated cluster authors of the one or more identified unassigned clusters with names of the selected individual's identified social contacts to automatically identify, among the unassigned clusters and author identities uniquely representing the identified social contacts within the computing system, one or more name-compatible pairs of a cluster and an author identity;

suggesting at least one of the one or more identified pairs as a candidate match to the selected individual with a request for confirmation that the social contact represented by the respective author identity is the disambiguated cluster author of the respective cluster, and, following receipt of the requested confirmation from the selected individual, assigning the cluster to the respective name-compatible author identity based at least in part on the confirmation.

\* \* \* \* \*

UNITED STATES PATENT AND TRADEMARK OFFICE
CERTIFICATE OF CORRECTION

Page 1 of 1

PATENT NO. : 9,928,291 B2
APPLICATION NO. : 15/199581
DATED : March 27, 2018
INVENTOR(S) : Häusler et al.

It is certified that error appears in the above-identified patent and that said Letters Patent is hereby corrected as shown below:

On the Title Page

On page 2, in Column 2, item (56), under "Other Publications", Line 3, delete "Unifaction"," and insert --Unification",-- therefor In the Claims In Column 38, Line 1, in Claim 13, delete "of" and insert --or-- therefor In Column 38, Line 5, in Claim 13, delete "on" and insert --one-- therefor Signed and Sealed this
Eighth Day of December, 2020

Andrei Iancu
*Director of the United States Patent and Trademark Office*